(12) United States Patent
Nohr et al.

(10) Patent No.: US 7,371,456 B2
(45) Date of Patent: *May 13, 2008

(54) NANOPARTICLE BASED INKS AND METHODS OF MAKING THE SAME

(75) Inventors: Ronald S. Nohr, Alpharetta, GA (US); John Gavin MacDonald, Decatur, GA (US)

(73) Assignee: Kimberly-Clark Worldwide, Inc., Neenah, WI (US)

(*) Notice: Subject to any disclaimer, the term of this patent is extended or adjusted under 35 U.S.C. 154(b) by 1060 days.

This patent is subject to a terminal disclaimer.

(21) Appl. No.: 09/969,539

(22) Filed: Oct. 2, 2001

(65) Prior Publication Data

US 2002/0149656 A1 Oct. 17, 2002

Related U.S. Application Data

(60) Provisional application No. 60/243,022, filed on Oct. 25, 2000, provisional application No. 60/237,142, filed on Oct. 2, 2000.

(51) Int. Cl.
*B32B 21/02* (2006.01)
*B32B 23/02* (2006.01)
*C09D 11/00* (2006.01)

(52) U.S. Cl. ............... 428/403; 428/404; 106/31.13; 106/31.65; 106/31.9; 523/161; 523/200; 523/202; 523/205; 523/206

(58) Field of Classification Search ............ 523/160, 523/161, 200, 202, 205, 206; 106/31.13, 106/31.65, 31.9; 428/403, 404

See application file for complete search history.

(56) References Cited

U.S. PATENT DOCUMENTS

| | | | |
|---|---|---|---|
| 4,187,194 A | 2/1980 | Wellman et al. | |
| 4,325,735 A | 4/1982 | Ohta et al. | |
| 4,336,027 A | 6/1982 | Tussing | |
| 4,487,855 A | 12/1984 | Shih et al. | |
| 4,585,484 A | 4/1986 | Haruta et al. | |

(Continued)

FOREIGN PATENT DOCUMENTS

DE 198 21 665 A1 12/1998

(Continued)

OTHER PUBLICATIONS

Caruso et al., "ElectrostaticSelf-Assembly of Silica Nanoparticle-Polyelectrolyte Multilayers on Polystyrene Latex Particles", Journal of the American Chemical Society, 1998, pp. 8523-8524, vol. 120.

(Continued)

*Primary Examiner*—Betelhem Shewareged
(74) *Attorney, Agent, or Firm*—Dority & Manning, P.A.

(57) ABSTRACT

The present invention provides nanoparticle based recording mediums, inks and ink compositions, methods of making nanoparticle based recording mediums and inks, nanoparticles and methods for making nanoparticles, methods for stabilizing colorants against electromagnetic radiation (including radiation in the visible wavelength range), methods for enhancing the substrate independent durability performance of inks, and methods for color density control. The nanoparticle based inks deliver better color, color density control, improved printability, enhanced durability, and increased lightfastness, and are capable of being printed on woven and non-woven fabrics and paper products without special treatment or other limitations.

19 Claims, 3 Drawing Sheets

U.S. PATENT DOCUMENTS

| | | | |
|---|---|---|---|
| 4,701,128 A | 10/1987 | Fitzig et al. | |
| 4,701,218 A | 10/1987 | Barker et al. | |
| 4,710,525 A | 12/1987 | Kraemer et al. | |
| 4,726,844 A | 2/1988 | Greenwood | |
| 4,767,459 A | 8/1988 | Greenwood et al. | |
| 4,783,220 A | 11/1988 | Gamble et al. | |
| 4,812,492 A | 3/1989 | Eckes et al. | |
| 4,836,851 A | 6/1989 | Pawlowski et al. | |
| 4,945,121 A | 7/1990 | Micale et al. | |
| 4,957,553 A | 9/1990 | Koike et al. | |
| 4,963,189 A | 10/1990 | Hindagolla | |
| 4,980,257 A | 12/1990 | Anno et al. | |
| 5,006,862 A | 4/1991 | Adamic | |
| 5,017,227 A | 5/1991 | Koike et al. | |
| 5,034,058 A | 7/1991 | Akiyama et al. | |
| 5,062,893 A | 11/1991 | Adamic et al. | |
| 5,064,694 A | 11/1991 | Gee | |
| 5,067,980 A | 11/1991 | Koike et al. | |
| 5,069,719 A | 12/1991 | Ono | |
| 5,091,004 A | 2/1992 | Tabayashi et al. | |
| 5,092,926 A | 3/1992 | Owatari | |
| 5,098,474 A | 3/1992 | Pawlowski et al. | |
| 5,100,470 A | 3/1992 | Hindagolla et al. | |
| 5,133,803 A | 7/1992 | Moffatt | |
| 5,135,832 A | 8/1992 | Sacripante et al. | |
| 5,145,518 A | 9/1992 | Winnik et al. | |
| 5,151,128 A | 9/1992 | Fukushima et al. | |
| 5,156,675 A | 10/1992 | Breton et al. | |
| 5,160,535 A | 11/1992 | Cooke et al. | |
| 5,190,581 A | 3/1993 | Fukushima et al. | |
| 5,203,912 A | 4/1993 | Greenwood et al. | |
| 5,220,346 A | 6/1993 | Carriera et al. | |
| 5,221,332 A | 6/1993 | Kohlmeier | |
| 5,223,026 A | 6/1993 | Schwartz, Jr. | |
| 5,226,957 A | 7/1993 | Wickramanayake et al. | |
| 5,230,732 A | 7/1993 | You et al. | |
| 5,258,065 A | 11/1993 | Fujisawa | |
| 5,269,840 A | 12/1993 | Morris et al. | |
| 5,274,025 A | 12/1993 | Stockl et al. | |
| 5,298,035 A | 3/1994 | Okamoto | |
| 5,302,195 A | 4/1994 | Helbrecht et al. | |
| 5,340,929 A | 8/1994 | Ono et al. | |
| 5,344,489 A | 9/1994 | Matijevic et al. | |
| 5,344,872 A | 9/1994 | Debord et al. | |
| 5,370,730 A | 12/1994 | Gregory et al. | |
| 5,382,283 A | 1/1995 | Yui et al. | |
| 5,407,770 A | 4/1995 | Tomita et al. | |
| 5,431,723 A | 7/1995 | Bermes et al. | |
| 5,439,514 A | 8/1995 | Kashiwazaki et al. | |
| 5,441,561 A | 8/1995 | Chujo et al. | |
| 5,484,475 A | 1/1996 | Breton et al. | |
| 5,512,095 A | 4/1996 | Sens et al. | |
| 5,531,817 A | 7/1996 | Shields et al. | |
| 5,538,548 A | 7/1996 | Yamazaki | |
| 5,565,022 A | 10/1996 | Wickramanayake | |
| 5,605,566 A | 2/1997 | Yui et al. | |
| 5,626,654 A | 5/1997 | Breton et al. | |
| 5,626,655 A | 5/1997 | Pawloswski et al. | |
| 5,633,109 A | 5/1997 | Jennings et al. | |
| 5,652,282 A * | 7/1997 | Baker et al. | 523/201 |
| 5,656,072 A | 8/1997 | Kato et al. | |
| 5,661,197 A | 8/1997 | Villiger et al. | |
| 5,667,572 A | 9/1997 | Taniguch et al. | |
| 5,679,138 A | 10/1997 | Bishop et al. | |
| 5,679,724 A | 10/1997 | Sacripante et al. | |
| 5,684,063 A | 11/1997 | Patel et al. | |
| 5,693,126 A | 12/1997 | Ito | |
| 5,698,616 A | 12/1997 | Baker et al. | |
| 5,705,222 A | 1/1998 | Somasundaran et al. | |
| 5,725,643 A | 3/1998 | Higashiyama | |
| 5,749,951 A | 5/1998 | Yoshiike et al. | |
| 5,753,026 A | 5/1998 | Kuntz et al. | |
| 5,756,561 A | 5/1998 | Wang et al. | |
| 5,763,130 A | 6/1998 | Sasaki et al. | |
| 5,769,931 A | 6/1998 | Wang et al. | |
| 5,777,639 A | 7/1998 | Kageyama et al. | |
| 5,785,745 A | 7/1998 | Lauw et al. | |
| 5,788,749 A | 8/1998 | Breton et al. | |
| 5,788,753 A | 8/1998 | Pawlowski et al. | |
| 5,810,917 A | 9/1998 | Yamazaki et al. | |
| 5,814,685 A | 9/1998 | Satake et al. | |
| 5,833,744 A | 11/1998 | Breton et al. | |
| 5,843,509 A | 12/1998 | Calvo Salve et al. | |
| 5,852,073 A | 12/1998 | Villiger et al. | |
| 5,855,660 A | 1/1999 | Bujard et al. | |
| 5,868,823 A | 2/1999 | Yamazaki et al. | |
| 5,877,235 A | 3/1999 | Sakuma et al. | |
| 5,879,439 A | 3/1999 | Nagai et al. | |
| 5,880,176 A | 3/1999 | Kamoto et al. | |
| 5,882,391 A | 3/1999 | Gregory et al. | |
| 5,882,392 A | 3/1999 | Gregory et al. | |
| 5,888,286 A | 3/1999 | Gregory et al. | |
| 5,891,230 A | 4/1999 | Gregory et al. | |
| 5,891,232 A | 4/1999 | Moffatt et al. | |
| 5,891,934 A | 4/1999 | Moffatt et al. | |
| 5,911,816 A | 6/1999 | Gore | |
| 5,916,596 A | 6/1999 | Desai et al. | |
| 5,928,416 A | 7/1999 | Gundlach et al. | |
| 5,928,419 A | 7/1999 | Uemura et al. | |
| 5,935,309 A | 8/1999 | Moffatt et al. | |
| 5,935,310 A | 8/1999 | Engel et al. | |
| 5,936,008 A * | 8/1999 | Jones et al. | 523/161 |
| 5,942,027 A | 8/1999 | Ikai et al. | |
| 5,944,883 A | 8/1999 | Saibara et al. | |
| 5,948,155 A | 9/1999 | Yui et al. | |
| 5,955,515 A * | 9/1999 | Kimura et al. | 523/161 |
| 5,958,998 A | 9/1999 | Foucher et al. | |
| 5,962,566 A | 10/1999 | Grandfils et al. | |
| 5,964,930 A | 10/1999 | Saibara et al. | |
| 5,968,244 A | 10/1999 | Ueda et al. | |
| 5,972,389 A | 10/1999 | Shell et al. | |
| 5,973,025 A | 10/1999 | Nigam et al. | |
| 5,973,027 A | 10/1999 | Howald | |
| 5,980,623 A | 11/1999 | Hiraoka | |
| 5,981,623 A | 11/1999 | McCain et al. | |
| 5,993,527 A | 11/1999 | Tochihara et al. | |
| 5,993,856 A | 11/1999 | Ragavan et al. | |
| 6,015,454 A | 1/2000 | Lacroix et al. | |
| 6,015,455 A | 1/2000 | Yano et al. | |
| 6,019,827 A | 2/2000 | Wickramanayake et al. | |
| 6,024,785 A | 2/2000 | Morimoto | |
| 6,024,786 A | 2/2000 | Gore | |
| 6,025,412 A | 2/2000 | Sacripante et al. | |
| 6,031,024 A | 2/2000 | Uraki et al. | |
| 6,033,463 A | 3/2000 | Yui et al. | |
| 6,034,154 A | 3/2000 | Kase et al. | |
| 6,037,391 A | 3/2000 | Iida | |
| 6,045,606 A | 4/2000 | Matzinger | |
| 6,048,390 A | 4/2000 | Yano et al. | |
| 6,051,057 A | 4/2000 | Yatake et al. | |
| 6,057,384 A * | 5/2000 | Nguyen et al. | 523/160 |
| 6,090,193 A | 7/2000 | Nigam et al. | |
| 6,099,627 A | 8/2000 | Saibara et al. | |
| 6,110,266 A | 8/2000 | Gonzalez-Blanco et al. | |
| 6,113,680 A | 9/2000 | Aoyama et al. | |
| 6,121,365 A | 9/2000 | Saibara et al. | |
| 6,129,786 A | 10/2000 | Camara et al. | |
| 6,140,390 A | 10/2000 | Bugner et al. | |
| 6,147,139 A | 11/2000 | Shaw-Klein et al. | |
| 6,149,719 A | 11/2000 | Houle | |
| 6,153,001 A | 11/2000 | Suzuki et al. | |
| 6,159,649 A | 12/2000 | Macholdt et al. | |
| 6,165,440 A | 12/2000 | Esenaliev | |
| 6,171,382 B1 | 1/2001 | Stubbe et al. | |

| | | | |
|---|---|---|---|
| 6,511,534 B1 * | 1/2003 | Mishina et al. | 106/31.33 |
| 6,602,932 B2 | 8/2003 | Feldheim et al. | |
| 6,800,122 B2 * | 10/2004 | Anderson et al. | 106/31.03 |
| 2001/0019770 A1 | 9/2001 | Eian et al. | |
| 2003/0021983 A1 * | 1/2003 | Nohr et al. | 428/327 |
| 2003/0219384 A1 | 11/2003 | Donath et al. | |

FOREIGN PATENT DOCUMENTS

| | | |
|---|---|---|
| EP | 0 318 612 A1 | 6/1989 |
| EP | 0318612 A1 | 6/1989 |
| EP | 0 861 880 A1 | 9/1998 |
| EP | 0 972 563 A1 | 1/2000 |
| JP | 56 143 272 A | 11/1981 |
| JP | 63 105 078 A | 5/1988 |
| JP | 08-110654 | 4/1996 |
| JP | 08 259 868 A | 10/1996 |
| JP | 2000 129 179 A | 5/2000 |
| WO | WO 98 14524 A1 | 4/1998 |
| WO | WO 99 47252 A2 | 3/1999 |
| WO | WO 99 47253 A1 | 3/1999 |
| WO | WO 00 03797 A1 | 7/1999 |
| WO | WO-9947253 A1 | 9/1999 |
| WO | WO 99/63006 | 12/1999 |
| WO | WO 00 66090 A1 | 11/2000 |
| WO | WO 01/06054 A1 | 1/2001 |
| WO | WO 02/02347 A1 | 1/2002 |
| WO | PCT/US01/42433 | 11/2002 |

OTHER PUBLICATIONS

Cooper et al., "Formation of Polypeptide-Dye Multilayers by an Electrostatic Self-Assembly Technique", Langmuir, 1995, pp. 2713-*2718, vol. 11.

Icinoze et al., Layer-by Layer Assembly of Aqueous Bilayer Membranes on Charges Surfaces, Chemistry Letters, 1996, pp. 257-258.

Kotov, N.A., "Layer-by-Layer Self-Assembly: The Contribution of Hydrophobic Interactions", NanoStructured Materials, 1999, pp. 789-796, vol. 12.

Santra, et al., "Development of novel eye-doped silica nanoparticles for biomarker application," Journal of Biomedical Optics, Apr. 2001, pp. 160-166, vol. 6, No. 2.

Buchhammer, et al., "Nanoparticles based on polyelectrolyte complexes: effect of structure and net change on the sorption capability for solved organic molecules," Colloid and Polymer Science, Sep. 2000, pp. 841-847, vol. 278, No. 9.

Makarova, et al., "Adsorption and Encapsulation of Fluorescent Probe in Nanoparticles," The Journal of Physical Chemistry, Oct. 1999, pp. 9080-9084, vol. 103, No. 43.

Maskos, et al., "Amphiphilic Polyorganosiloxane Nanospheres: Encapsulation of Hydrophilic Dyes," abstract, 221st American Chemical Society Meeting, San Diego, CA, Apr. 1-5, 2001.

Buchhammer, H.-M., et al., "Nanoparticles based on polyelectrolyte complexes: effect of structure and net charge on the sorption capability for solved organic molecules," Colloid and Polymer Science, Sep. 2000, vol. 278, No. 9, pp. 841-847.

Makarova, O., et al., "Adsorption and Encapsulation of Fluorescent Probes in Nanoparticles," Journal of Physical Chemistry, Oct. 1999, vol. 103, No. 43, pp. 9080-9084.

U.S. Appl. No. 09/969,163 Non Final Office Action mailed Sep. 25, 2003, 28 pgs.

U.S. Appl. No. 09/969,163 Response filed Jan. 26, 2004 to Non Final Office Action mailed Sep. 25, 2003, 15 pgs.

U.S. Appl. No. 09/969,163 Final Office Action mailed Apr. 22, 2004, 8 pgs.

U.S. Appl. No. 09/969,163 Response filed Jul. 22, 2004 to Final Office Action mailed Apr. 22, 2004, 10 pgs.

U.S. Appl. No. 09/969,163 Non Final Office Action mailed Sep. 30, 2004, 13 pgs.

U.S. Appl. No. 09/969,163 Response filed Dec. 29, 2004 to Non Final Office Action mailed Sep. 30, 2004, 11 pgs.

U.S. Appl. No. 09/969,163 Non Final Office Action mailed Apr. 25, 2005, 9 pgs.

U.S. Appl. No. 09/969,163 Response filed Jul. 25, 2005 to Non Final Office Action mailed Apr. 25, 2005, 8 pgs.

U.S. Appl. No. 09/969,163 Notice of Allowance mailed Oct. 21, 2005, 13 pgs.

* cited by examiner

NANOPARTICLE BASED INKS AND METHODS OF MAKING THE SAME

CROSS REFERENCE TO RELATED APPLICATIONS

This application claims priority to Provisional Applications Ser. No. 60/237,142, filed Oct. 2, 2000, and Ser. No. 60/243,022, filed Oct. 25, 2000, the entirety of which are incorporated herein by reference.

TECHNICAL FIELD

The present invention relates to recording mediums, inks, ink compositions, methods of making recording mediums and inks, nanoparticles and methods of making nanoparticles.

BACKGROUND OF THE INVENTION

Typically, colorants tend to fade when exposed to electromagnetic radiation such as sunlight or artificial light and the like. It is believed that most of the fading of colorants when exposed to light is due to photodegradation mechanisms. These photodegradation mechanisms include oxidation or reduction of the colorants depending upon the environmental conditions in which the colorant is placed. Fading of colorants also depends upon the substrate upon which they reside.

Product analysis of stable photoproducts and intermediates has revealed several important modes of photodecomposition. These include electron ejection from the colorant, reaction with ground-state or excited singlet state oxygen, bond cleavage to form various products, reduction to form colorless leuco dyes and electron or hydrogen atom abstraction to form radical intermediates.

Various factors such as temperature, humidity, gaseous reactants, including $O_2$, $O_3$, $SO_2$, and $NO_2$, and water soluble, nonvolatile photodegradation products themselves have been shown to influence fading of colorants. The factors that effect colorant fading appear to exhibit a certain amount of interdependence. It is due to this complex behavior that observations for the fading of a particular colorant on a particular substrate cannot be applied to colorants and substrates in general.

Under conditions of constant temperature it has been observed that an increase in the relative humidity of the atmosphere increases the fading of a colorant for a variety of colorant-substrate systems (e.g., McLaren, K., *J. Soc. Dyers Colour*, 1956, 72, 527). For example, as the relative humidity of the atmosphere increases, a fiber may swell because the moisture content of the fiber increases. This aids diffusion of gaseous reactants through the substrate structure.

The ability of a light source to cause photochemical change in a colorant is also dependent upon the spectral distribution of the light source, that is, the proportion of radiation of wavelengths most effective in causing a change in the colorant and the quantum yield of colorant degradation as a function of wavelength. On the basis of photochemical principles, it might be expected that light of higher energy (short wavelengths) would be more effective at causing fading than light of lower energy (long wavelengths). Studies have revealed that this is not always the case. Over 100 colorants of different classes were studied and found that generally the most unstable were faded more efficiently by visible light while those of higher lightfastness were degraded mainly by ultraviolet light (McLaren, K., *J. Soc. Dyers Colour,* 1956, 72, 86).

The influence of a substrate on colorant stability can be extremely important. Colorant fading may be retarded or promoted by chemical groups within the substrate. Such groups can be a ground-state species or excited-state species. The porosity of the substrate is also an important factor in colorant stability. A high porosity can promote fading of a colorant by facilitating penetration of moisture and gaseous reactants into the substrate. A substrate may also act as a protective agent by screening the colorant from light of wavelengths capable of causing degradation.

The purity of the substrate is also an important consideration whenever the photochemistry of dyed technical polymers is considered. For example, technical-grade cotton, viscose rayon, polyethylene, polypropylene, and polyisoprene are known to contain carbonyl group impurities. These impurities absorb light of wavelengths greater than 300 nm, which are present in sunlight, and so, excitation of these impurities may lead to reactive species capable of causing colorant fading (van Beek, H. C. A., *Col. Res. Appl.,* 1983, 8(3), 176).

In addition to fading, colorants tend to bleed when applied to fabrics. Accordingly, a colorant system that exhibits enhanced stability and color fastness when printed or applied to any type of fabric is desired.

What is needed in the art is a colorant system that not only provides increased light fastness and better color stability, but also one which is capable of being printed on fabrics without special treatment or other limitations. In addition, a superior textile printing ink with substrate independent durability performance is needed. There also exists a need for methods and compositions which are capable of stabilizing a wide variety of colorants from the effects of electromagnetic radiation, such as sunlight and artificial light.

SUMMARY OF THE INVENTION

The present invention is directed to, among other things, new recording mediums, new inks, ink compositions, nanoparticles, methods of making and using nanoparticles, methods for stabilizing colorants against photodecomposition, and methods for stabilizing colorants against oxidation or reduction. In accordance with the present invention such recording mediums, when applied to substrates, exhibit improved water and detergent resistance. The present invention includes methods for enhancing the substrate independent durability performance of inks and methods to stabilize colorants against fading due to interactions with a substrate, as well as methods for color density control. By employing a nanoparticle template upon which to bind a colorant and/or charged polymer-colorant layer(s), this invention provides new recording mediums and ways to control their stability, durability and color intensity.

In general, the following discussion relates to particles having a diameter less than about 1,000 nanometers. However, the present invention is also directed towards particles having a diameter greater than 1,000 nanometers. The present invention is directed to recording mediums comprising particles or nanoparticles with a colloidal inner core which is used as a particle template surface. One aspect of the present invention is multiple, alternating layers of charged polymer-colorant (or polyelectrolyte-colorant) being assembled on the nanoparticle template core surface. Because these layers are characterized by alternating charges, layer integrity is maintained by a variety of chemical and physical forces, including coulombic forces, van der Waals forces and others. Different colorants may be used in sequential charged polymer-colorant layers to afford unusual or hard-to-obtain colors. Additionally, charged polymer-colorant layers may alternate with layers of charged polymer void of colorant ("void charged polymer" layers), in order to protect the colorant below the void charged polymer layers, to manipulate particle charge, or to alter its surface characteristics. Charged polymer layers may also contain "functional additives" such as UV or visible radiation filter molecules or substances to protect dyes from harmful radiation, leuco dyes or colorless predyes that develop color upon irradiation, or reactive species generators that react to fade colors upon irradiation. A final outside layer, comprised of a protective stratum of transparent charged polymer, may optionally be added to the nanoparticle. When assembled in this fashion, the final charge of this protective outer layer (zeta potential) is employed to enhance the adherence of the dye particle to the fabric surface during printing. Thus, by matching the nanoparticle charge to the opposite charge of the printing substrate or textile coating, strong coulombic attraction can be achieved, in addition to van der Waals and other physical and chemical forces. One aspect of the present invention includes the nanoparticle comprising a silica particle. However, other inorganic nanoparticles as well as organic and organometallic nanoparticles may be employed herein, the selection of which will be apparent to one of ordinary skill in the relevant art.

The present invention is also directed to nanoparticles that contain more than one colorant and optionally contain colorant stabilizers. The nanoparticles may comprise a charged polymer membrane or coating which prevents materials or reactants which might degrade the colorant from interacting with the colorant. The present invention is directed to nanoparticles with a colloidal inner core that is used as a template surface upon which to bind a series of functional layers. The nanoparticles may be incorporated into a variety of liquid mediums to form colorant compositions, including inks in ink jet processes.

The present invention is further directed to a method of stabilizing a colorant by assembling charged polymer layers, including multiple, alternating layers of charged polymer-colorant and colorless charged polymer, on a nanoparticle surface. In one aspect of the present invention, one or more colorant stabilizers are also incorporated in the charged polymer layers, thereby providing multiple levels of colorant protection from photodegradation mechanisms.

The present invention is also directed to recording mediums containing the above-described nanoparticles. The recording mediums may be applied to any substrate to impart a color to the substrate. One aspect of the present invention is that, a colorant composition comprising the nanoparticles described above, a liquid medium and a pre-polymer is coated onto a substrate and subsequently exposed to radiation to fix the nanoparticle to the substrate via the polymerization of the pre-polymer.

Another aspect of the present invention is the above described nanoparticles being present in a polymer coating of a heat transfer product, such as is used for transferring graphic images onto clothing.

The above described nanoparticles are very effective in ink jet inks. Use of the nanoparticles, as described herein, intensifies the colors and stabilizes the colorants when they are exposed to light and other potentially degrading conditions. Additionally, the nanoparticles are effective in coatings for paper products and textiles.

These and other features and advantages of the present invention will become apparent after a review of the following detailed description of the disclosed embodiments.

DETAILED DESCRIPTION OF THE INVENTION

Figure 1:
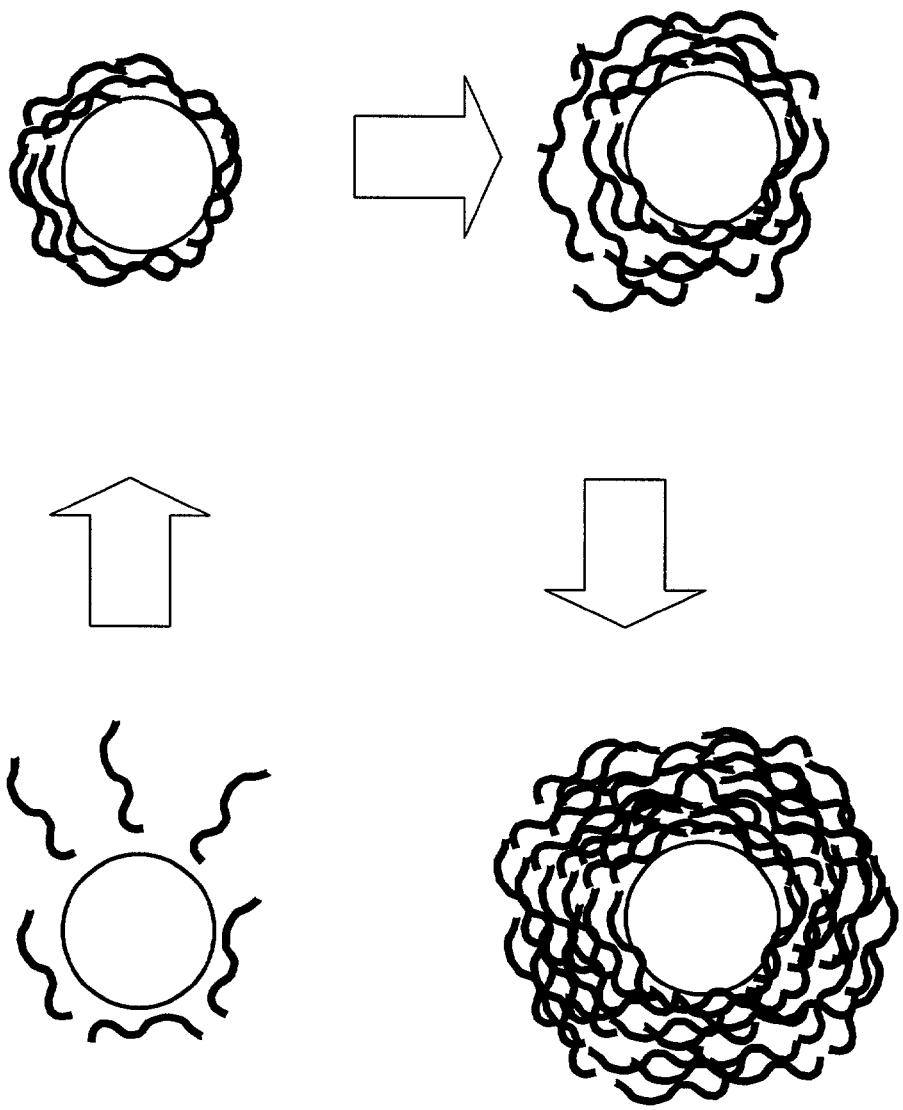
FIG. 1 illustrates one aspect of the present invention, depicting the formation of a nanoparticle by adding multiple layers of charged polymer-colorant or alternating layers of charged polymer-colorant/colorless charged polymer onto a nanoparticle template. The size of the resulting nanoparticle will increase accordingly, as shown.

The following discussion relates to particles having a diameter less than about 1,000 nanometers; however, the present invention is also directed towards particles having a diameter greater than 1,000 nanometers. According to the present invention recording media contain nanoparticles with a colloidal inner particle template which is used as a template surface. The nanoparticles, before coating, may have an average particle size or diameter of less than about 100 nanometers (nm). In another aspect of the present invention, the average particle size may be less than about 25 nm. Further, the nanoparticles may have an average size of about 15 nm.

The nanoparticles of the present invention comprise inorganic or organic materials, such as aluminum oxide, titanium dioxide, antimony tin oxide, cerium oxide, copper oxide, indium tin oxide, iron oxide, yttrium oxide, zinc oxide, iron oxide, gold, silver, copper, iron, alloys of tin and copper, carbon (charcoal), sulfur, silicon, fluorosil, a variety of organic polymers, such as melamine formaldehyde, nylon, polystyrene, polyester, polyamides, combinations thereof, derivatives thereof, or copolymers thereof. However, in addition to various oxides, nanoparticles may also comprise borides, carbides, suicides, nitrides, phosphides, arsenides, sulfides, selenides, tellurides, fluorides, chlorides, bromides, or iodides, or combinations thereof.

The nanoparticles of the present invention may be any shape, for example, a sphere, crystal, rod, disc, or tube, depending upon the shape of the nanoparticle template itself. In one aspect of the present invention, the nanoparticles comprise an organic polymer, wherein the nanoparticles are formed in an oil/water system by high shear emulsification. The nanoparticle are characterized by a positive or negative zeta potential, which is significant in coating the nanoparticle with colorant, charged polymer, functional layers, and/or protective layers.

The size of the charged polymer-colorant coated nanoparticles varies according to the number of alternating layers of charged polymer-colorant polymer and charged polymer that are layered on the particle. In one example, uncoated silica nanoparticles between about 11 and about 14 nm in diameter produced layered particles between about 30 and about 36 nm in diameter. The diameter of the coated nanoparticle is typically less than about 1000 nm for ink jet compositions, but may be less than about 400 nm, or even less than about 100 nm. Table 1 illustrates the increase in the average diameter of the nanoparticle after being coated with a charged polymer-colorant layer. In Table 1, the positive polyelectrolyte or charged polymer (abbreviated PE(+)) is polyethylenimine, permethylated, perbromide (MW=1800, Polysciences, Warrington, Pa.), and the negative polyelectrolyte or charged polymer (abbreviated PE(−)) is poly(vinylsulfonic acid, sodium salt) MW=2000, Polysciences, Warrington, Pa.).

TABLE 1

Nanoparticle Size Determination

| Sample | Mean Diameter (nm) | Polyelectrolyte Layer Thickness (nm) |
|---|---|---|
| SNOWTEX ™ C | 10.2 | — |
| 0.01 M SNOWTEX ™ C/PE(+) | 15.5 | 2.6 |
| 0.1 M SNOWTEX ™ C/PE(+) | 18.9 | 4.4 |
| 0.01 M SNOWTEX ™ C/PE(+)/PE(−) | 51.2 | 17.9 |
| 0.1 M SNOWTEX ™ C/PE(+)/PE(−) | 48.2 | 16.7 |

FIG. 1 illustrates one aspect of the present invention, namely the formation of a nanoparticle by adding multiple layers of charged polymer-colorant or alternating layers of charged polymer-colorant/colorless charged polymer onto a nanoparticle template. The size of the resulting colored nanoparticle will increase accordingly, as shown. In this figure, charges on the nanoparticle and charged polymer are not specified.

In one aspect, the nanoparticle of the recording medium has, multiple, alternating layers of charged polymer-colorant and colorless charged polymer or "void" charged polymer (without a colorant) layers assembled on the nanoparticle template surface. Another aspect of the present invention is multiple, alternating layers of charged polymer-colorant being assembled on the nanoparticle template core surface without void charged polymer layers between the charged polymer-colorant layers. In one aspect, different colorants may be used in sequential charged polymer-colorant layers to afford tailored colors. The particle template may have an initial coating of colorant or other functional additive layers, prior to coating by a charged polymer or charged polymer-colorant layers. Charged polymer layers may also contain "functional additives" such as UV or visible radiation filter molecules to protect dyes from harmful radiation, leuco dyes or colorless predyes that develop color upon irradiation, or reactive species generators that react to fade colors upon irradiation. Because, in one aspect, layers are characterized by alternating charges, the integrity of the layers is maintained by coulombic forces, as well as by van der Waals and other physical and chemical forces. Changes in the zeta potential after each layer confirms substantially uniform and substantially complete coating has been achieved. Table 2 illustrates the zeta potential of the nanoparticle following the disposition of sequential charged polymer-colorant layers on the particle template. In Table 2, the positive charged polymer (abbreviated PE(+)) is polyethylenimine, permethylated, perbromide (MW=1800, Polysciences, Warrington, Pa.), and the negative polyelectolyte (abbreviated PE(−)) is poly(vinylsulfonic acid, sodium salt) MW=2000, Polysciences, Warrington, Pa.). Each numerical column in Table 2, from left to right, represents a successive PE/dye layer being deposited on the nanoparticle, which is oppositely charged from the underlying layer.

TABLE 2

Zeta Potentials (mV) of Polyelectrolyte (PE)/Dye Deposited SNOWTEX ™ C (SNC)

| | SNOWTEX ™ C | PE(+)/ SNC | PE(−)/ PE(+)/ SNC | PE(+)/PE(−)/ PE(+)/SNC |
|---|---|---|---|---|
| Magenta Dye Sulforhodamine B | −25 | +18 | −21 | +35 |
| CIBACRON ® YEllow P-6GS | −25 | +17 | −22 | +36 |
| Copper Phthalocyanine, Tetrasulfonic Acid, Tetra Sodium Salt | −25 | +37 | −42 | +38 |

A final outside layer, comprised of a protective stratum of transparent charged polymer, may optionally be added to the nanoparticle. When assembled in this fashion, the final charge of this protective outer layer (zeta potential) is employed to adhere the dye particle to the fabric surface during printing. Thus, by matching the nanoparticle charge to the opposite charge of the printing substrate or textile coating, strong coulombic attraction between the nanoparticle and the substrate can be achieved, in addition to any other physical and chemical forces that augment this attraction.

Figure 2:
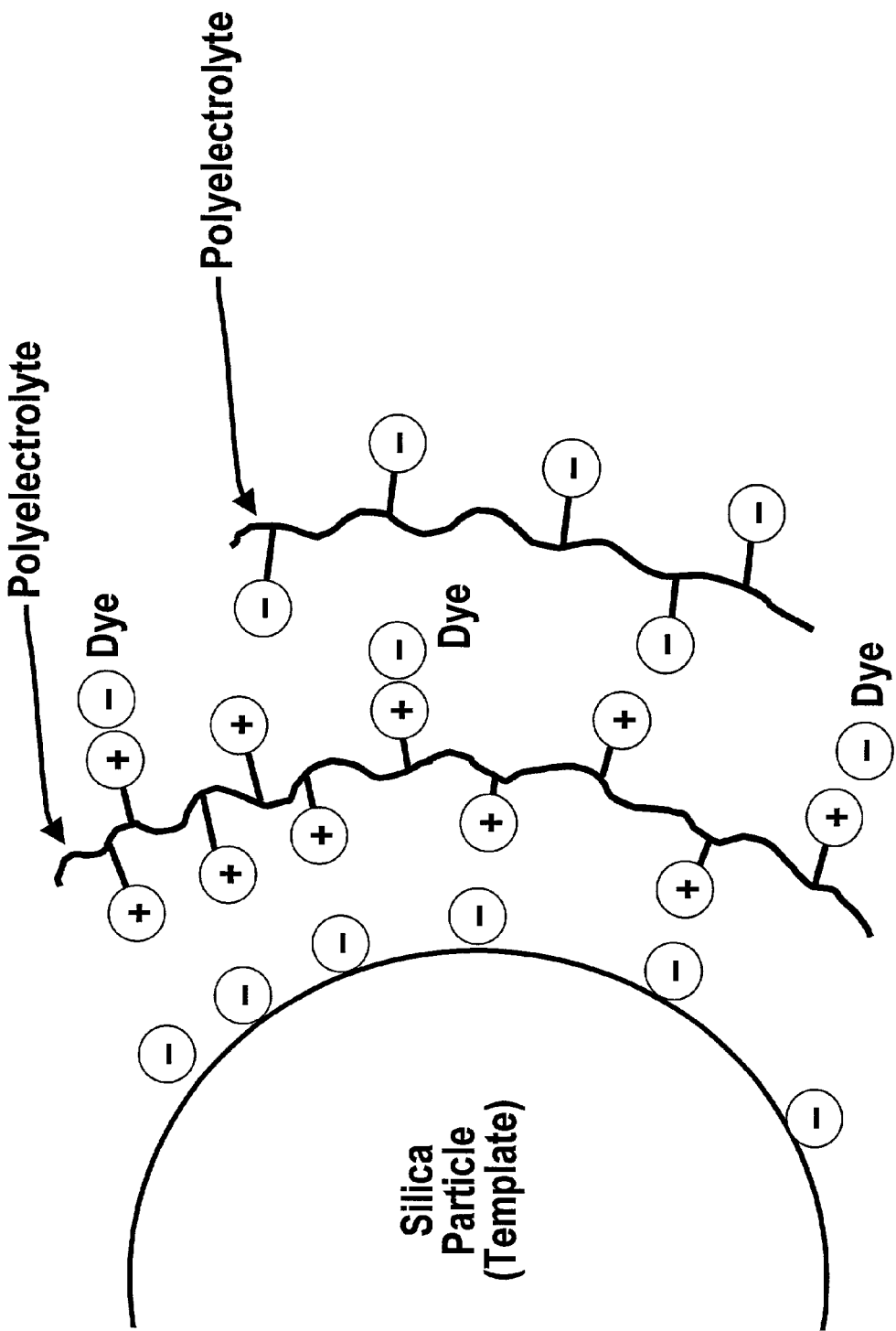
FIG. 2. illustrates one aspect of the present invention, depicting the formation of a nanoparticle by adding multiple layers of alternating charge of charged polymer-colorant and colorless charged polymer onto a charged silica nanoparticle template. This figure emphasizes the coulombic forces, in addition to the van der Waals and other physical and chemical forces, that increase the stability of the nanoparticle, and provide greater colorfastness of the resultant inks.

FIG. 2. illustrates one aspect of the present invention, that is the formation of a nanoparticle by adding multiple layers of alternating charge of charged polymer-colorant and colorless charged polymer onto a charged silica nanoparticle template. Among other things, this figure demonstrates how the integrity of the layers is maintained by coulombic forces in addition to van der Waals and other physical and chemical forces, how a final outside layer comprised of a protective stratum of charged polymer may be added to the nanoparticle, and how the coulombic and other forces that increase the stability of the colored nanoparticle provide greater colorfastness of the resultant inks.

Figure 3:
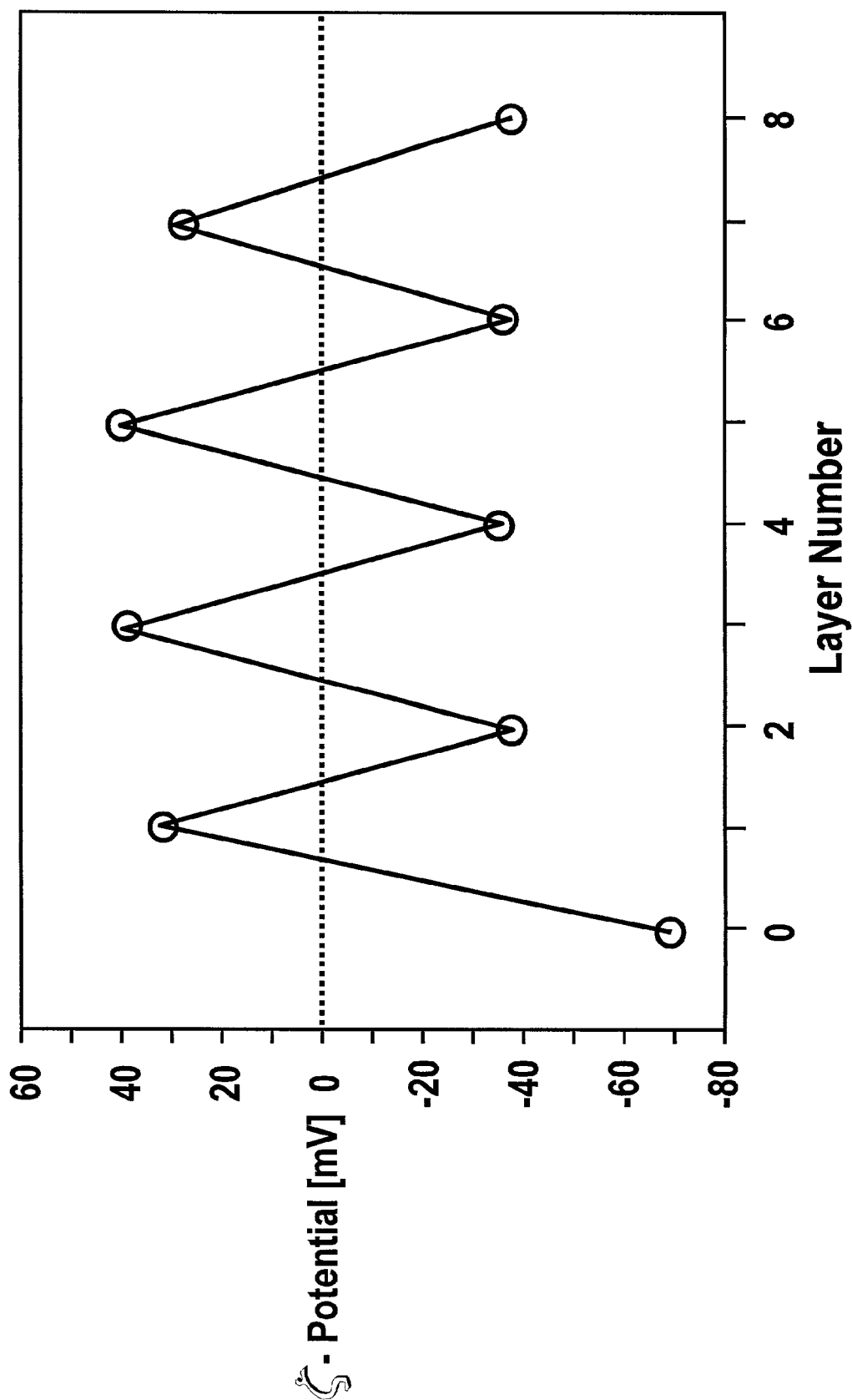
FIG. 3 illustrates one aspect of the present invention, depicting the change in zeta potential of a nanoparticle of the present invention during its assembly, as sequential, oppositely charged layers of charged polymers (with or with colorants associated) are associated with the nanoparticle in a stepwise fashion. The measurements shown are for silica nanopaticles being layered with a PE(+) of poly(2-methacryloxyethyltrimethyl ammonium bromide) with acid red 52 associated therewith (layers 1, 3, 5 and 7) and a PE(−) of poly(styrene sulfonic acid, sodium salt) (layers 2, 4, 6 and 8).

FIG. 3 illustrates another aspect of this invention by recording the change in zeta potential of a nanoparticle during its assembly, as sequential, oppositely charged layers of charged polymers (with or without colorants associated) are layered onto the nanoparticle in a stepwise fashion. The measurements shown are for silica nanopaticles being assembled with a PE(+) of poly(2-methacryloxyethyltrimethyl ammonium bromide) with acid red 52 associated therewith (layers 1, 3, 5 and 7) and a PE(−) of poly(styrene sulfonic acid, sodium salt) (layers 2, 4, 6 and 8). We note however, that it is not necessary that a nanoparticle that is being formed in this manner exhibit an opposite zeta potential from the polymer charge that is being applied or coated thereto. Thus, the layer-by-layer self-assembly of simply differently-charged polymers (with or without colorant associated therewith) may be effected in the same way as assembling a nanoparticle with alternately-charged layers.

The presence of surface charges on suspended particles, including the nanoparticle template of the present invention, can arise by a variety of phenomena. Possibilities include the presence of lattice imperfections, various chemical reactions on the surface (e.g. dissociation of functional surface groups), the presence of surface-adsorbed ions, and adsorption or dissociation of charge-bearing molecules. The dissociation of functional surface groups that are charged and/or adsorption of ions are aspects of the present invention. The surface adsorption of larger molecules containing charged groups such as surfactants and charged polymers may also play a role in the present invention. The surface charge of the particles is compensated in the liquid phase by counter ions, thereby ensuring the condition of electrical neutrality in the system as a whole.

The strong coulombic and other physical and chemical forces between the nanoparticle and the printing substrate provide enhanced stability, durability, and light fastness. In addition, by alternating colorant layers with a protective outer layer sheath, light fastness may be enhanced. The ability to coat a nanoparticle with multiple layers also allows for color density control.

This layer-by-layer self-assembly of alternately-charged and/or differently-charged, charged polymer-colorant polymers (including, in some embodiments, colorless charged polymer) bound to a nanoparticle template provides the resulting recording medium or ink with enhanced light fastness, unlimited use of water soluble dyes (containing charge centers), control of color density, and strong fabric bonding via coulombic, van der Waals and other attractive forces leading to enhanced durability. In addition, control of color density may also be achieved by adjusting reaction times between the nanoparticle substrate and the charged polymer-colorant where the extent of coating the particle dictates color density.

The present invention is also directed to nanoparticles that contain more than one colorant and optionally contain colorant stabilizers. The nanoparticles comprise a charged polymer membrane or coating which prevents materials or reactants which might degrade the colorant from interacting with the colorant.

In addition, the nanoparticles may be incorporated into a variety of liquid mediums to form colorant compositions. One aspect of the present invention is directed towards a nanoparticle comprising ultraviolet colorant stabilizers such as hydroxybenzophenones, benzotriazoles, metalloporphines and triiodophenols.

The present invention is further directed to a method of stabilizing a colorant by assembling multiple, alternating layers of polyelectrolyte-colorant and colorless charged polymer on a nanoparticle surface. One aspect of the present invention includes one or more colorant stabilizers being incorporated in the charged polymer layers, thereby providing multiple levels of colorant protection from photodegradation mechanisms.

The present invention is also directed to recording mediums containing the above-described nanoparticles. The recording mediums may be applied to any substrate to impart a color to the substrate. One aspect of the present invention involves a recording medium comprising the nanoparticles described above, a liquid medium and a pre-polymer coated onto a substrate and subsequently exposed to radiation to fix the nanoparticle to the substrate via the polymerization of the pre-polymer.

Another aspect of the present invention involves the above described nanoparticles present in a polymer coating of a heat transfer product, such as is used for transferring graphic images onto clothing.

The above described nanoparticles are very effective in ink jet inks. Use of the nanoparticles, as described herein, intensifies the colors and stabilizes the colorants when they are exposed to light and other potentially degrading conditions. Additionally, the nanoparticles are effective in coatings for paper products and textiles.

To describe the various aspects of the present invention, the following definitions are provided.

As used herein, the term "colorant" is meant to include, without limitation, any material which typically will provide tint or color to a substrate. The term is meant to include a single material or a mixture of two or more materials. Suitable colorants for use in the present invention include, but are not limited to, dyes and pigments. The colorant can be an organic dye.

A "nanoparticle", as used herein, refers to nanometer-sized inorganic, organic, or organometallic particles that contain at least one metal or non-metal element as a component. This definition includes, but is not limited to, particles of borides, carbides, silicides, nitrides, phosphides, arsenides, oxides, sulfides, selenides, tellurides, fluorides, chlorides, bromides, or iodides, or combinations thereof. This term also encompasses more complex inorganic species such as a single chemical phase in which more than one metal is combined with another element (e.g. a bimetallic oxide such as antimony tin oxide or indium tin oxide), a single chemical phase in which a metal is combined with more than one other element (e.g. a metal oxycarbide or a metal carbonitride), derivatives thereof, and combinations thereof in nanoparticle form. It is to be understood that metal oxides encompassed by this invention, include but are not limited to, oxides of silicon, aluminum, titanium, zirconium, iron, antimony, tin, cerium, barium, manganese, vanadium, chromium, lead, copper, indium, yttrium, zinc, mixed oxides thereof, and combinations of oxides thereof. A "mixed oxide", as used herein, describes a single chemical phase in which more than one metal is combined with oxygen to form a single chemical compound. For example, $BaTiO_3$ and $YMnO_3$ represents mixed oxides which are different from mixtures of two oxide compounds, of which an $In_2O_3/SnO_2$ mixture is an example. The nanoparticles of the present invention also encompass dye or pigment crystallites, either alone or associated with another nanoparticle of this invention, that can then be coated with charged polymer-colorant layers as described herein.

"Nanoparticle", as used herein, also encompasses organic-based nanoparticles. This description includes, but is not limited to, polymer particles, such as particles of polyacetals, polyacetaldehydes, polyacetates, polyacetylenes, polyacrylamides, polyamideimides, polyacrylates, polyacrylic acids, polyacrylonitriles, poly(melamine formaldehyde), polyalkylsilynes, poly(amic acids), polyamides, polycaproic acids, polyanilines, polyaramides, polyarylates, polybenzimidazoles, polybenzothiazones, polybenzoxazoles, polyalkadienes (such as polybutadienes or polypentadienes), polybutenes, poly(alkylene terphahalates), poly (caprolactams), poly(caprolactones), polycarbonates, polycarbosilanes, polychloroprenes, polyalkylenes (such as polyethylenes, polypropylenes, and polybutenes), polyalkyleneoxides (such as polyethylene oxides or poly-p-phenyleneoxides), polyalkylenesulfides (such as polyethylene sulfides), polysilanes, polysiloxanes, polysilylenes, polyepichlorohydrins, polyesteramides, polyesters, polyimides, polyethers, polyalkylene glycols, polyglycols, polyether glycols, polyetherimides, polyketones, polysulfones, polyethyleneimines, polyimidosulfides, polyketones, polyisoprenes, polyphosphates, polynitriles, polystyrenes, polyurethanes, polytriazoles, polyterpenes, polynitrides and polysulfides. However, the organic nanoparticles that are encompassed by the present invention are not limited to polymer particles, as particles of non-polymeric organic molecules, oligomers, resins, and mixtures are included herein.

The term "charged polymer" or the term "polyelectrolyte" are, in general, used interchangeably herein to include, without limitation any polymer or oligomer that is charged. Therefore, this term includes any polymer comprising an electrolyte, that is, a polymer comprising formal charges and its associated counter ions, the identity and selection of which will be well known to one of ordinary skill in the art. However, this term is also used to include polymers that can be induced to carry a charge by, for example, adjusting the pH of their solutions. For example, the polyelectrolyte poly(butyl acrylate-methacryloxyethyl) trimethylammonium bromide is included in the use of the term "charged polymer", as is the polymer poly[N,N'-bis(2,2,6,6-tetramethyl-4-piperidinyl)-1,6-hexanediamine-co-2,4-dichloro-6-morpholino-1,3,5-triazine] which can readily be protonated so that it becomes charged. Additional terms "polyelectrolyte-polymer", "colorless charged polymer", "colorless polyelectrolyte", "void charged polymer", "void polyelectrolyte", or "transparent charged polymer", and so forth, are used herein to refer to a charged polymer. Charged polymers or polyelectrolytes are abbreviated PE throughout, and may be designated as positively charged PE(+) or negatively charged PE(−). Examples of polycations used herein are polyethyleneimine permethylated perbromide and poly(2-methacryloxyethyltrimethyulammonium bromide). Examples of polyanions used herein are poly(vinyl sulfonic acid, sodium salt) and poly(styrene sulfonic acid, sodium salt).

The terms "charged polymer-colorant" (alternatively, "colorant-charged polymer"), "polyelectrolyte-colorant", "complexed colorant" or similar terms like "complexed dye" are used herein, without limitation, to refer to a colorant that is associated, adsorbed, bonded, or complexed in any way with a charged polymer, including but not limited to, coulombic, van der Waals and other physical and chemical forces.

The term "zeta potential" is used herein to mean without limitation a potential gradient that arises across an interface. This term especially refers to the potential gradient that arises across the interface between the boundary layer in contact with the nanoparticle of the present invention and the moveable diffuse layer in which the nanoparticle is suspended. Zeta potential measurements were taken using a Zetapals Instrument (Brookhaven Instrument Corporation, Holtsville, N.Y.), by adding 1-3 drops of sample into a cuvet containing 1 mM KCl solution, using the instrument's default functions preset for aqueous solutions.

The term "light-stable" as used herein means, without limitation, that the colorant, when associated with a charged polymer which itself is associated with a nanoparticle, is more stable to electromagnetic radiation, including, but not limited to, sunlight or artificial light, than when the colorant is not associated with a nanoparticle.

The term "artificial light" as used herein is meant to mean, without limitation, light having a relatively broad bandwidth that is produced from conventional light sources, including, but not limited to, conventional incandescent light bulbs and fluorescent light bulbs.

The term "molecular includant," as used herein, is intended to mean, without limitation, any substance having a chemical structure which defines at least one cavity. That is, the molecular includant is a cavity-containing structure. As used herein, the term "cavity" is meant to include any opening or space of a size sufficient to accept at least a portion of the colorant. Examples of molecular includants include, but are not limited to, the cyclodextrins, which are discussed below.

The term "functionalized molecular includant" as used herein is meant to mean, without limitation, a molecular includant to which one or more molecules of a colorant stabilizer are covalently coupled to each molecule of the molecular includant.

The term "degree of substitution" is used herein to refer to the number of these molecules or leaving groups (defined below) which are covalently coupled to each molecule of the molecular includant.

The term "derivatized molecular includant" as used herein is meant to include, without limitation, a molecular includant having more than two leaving groups covalently coupled to each molecule of molecular includant.

The term "leaving group" as used herein, is meant to mean, without limitation, any chemical group capable of participating in a nucleophilic substitution reaction.

Forming Nanoparticle Inks

The present invention is further directed to a method of coating nanoparticles with colorants. One method of coating the nanoparticles of the present invention comprises forming a solution containing a charged polymer and a dye (or other colorant), and mixing this charged polymer-colorant solution with a colloidal suspension of nanoparticles. Because these layers are characterized by alternating charges, layer integrity is thereby maintained by coulombic forces, augmented by van der Waals and other physical and chemical forces.

One aspect of the present invention is that the recording medium containing the nanoparticle comprises a silica particle. However, other inorganic nanoparticles as well as organic and organometallic nanoparticles may be employed herein, the selection of which will be apparent to one of ordinary skill in the relevant art.

As discussed in the examples below, a silica nanoparticle which can be employed in the present invention is commercially available as a colloidal suspension known as SNOWTEX™ (Nissan Chemical America Corporation). For example, SNOWTEX™ C is characterized by a silica particle size from about 11 to about 14 nm in diameter. Many other particles of various shapes may e used as templates in the present invention, the selection of which will be apparent to one of ordinary skill in the relevant art. For example, the nanoparticle can be inorganic (e.g. silica) or organic (e.g. poly(methylstyrene). In one embodiment, the nanoparticle core can comprise melamine resin (poly(melamine formaldehyde)) nanoparticles. Another embodiment of the present invention comprises a nanoparticle core of a preformed organic polymer that is dissolved in an organic solvent, and high shear emulsification in an oil/water system results in nanoparticle formation. The resultant nanoparticles are then coated with charged polymer layers, in which some of the charged polymer has a dye complexed with it. The resultant polymer nanoparticles may also be coated with charged polymer layers comprising different dyes associated with the charged polymer to achieve fine control over color and hue.

In another aspect of this invention, a final protective stratum of colorless charged polymer, may be added to the nanoparticle after it has been coated with alternating charged polymer-colorant, and colorless charged polymer layers.

Suitable colorants for use in the present invention include, but are not limited to, dyes and pigments. The colorant may be an organic dye. Organic dye classes include, by way of illustration only, triarylmethyl dyes, such as Malachite Green Carbinol base {4-(dimethylamino)-α-[4-(dimethylamino)phenyl]-α-phenyl-benzene-methanol}, Malachite Green Carbinol hydrochloride {N-4-[[4-(dimethylamino)phenyl]phenyl-methylene]-2,5-cyclohexyldien-1-ylidene]-N-methyl-methanaminium chloride or bis[p-(dimethylamino)phenyl]phenylmethylium chloride}, and Malachite Green oxalate {N-4-[[4-(dimethylamino)-phenyl]-phenylmethylene]-2,5-cyclohexyldien-1-ylidene]-N-methyl-methanaminium chloride or bis[p-(dimethylamino)-phenyl]phenylmethylium oxalate}; monoazo dyes, such as Cyanine Black, Chrysoidine [Basic Orange 2; 4-(phenylazo)-1,3-benzenediamine monohydrochloride], Victoria Pure Blue BO, Victoria Pure Blue B, basic fuschin and β-Naphthol Orange; thiazine dyes, such as Methylene Green, zinc chloride double salt [3,7-bis(dimethylamino)-6-nitrophenothiazin-5-ium chloride, zinc chloride double salt]; oxazine dyes, such as Lumichrome (7,8-dimethylallox-azine); naphthalimide dyes, such as Lucifer Yellow CH {6-amino-2-[(hydrazino-carbonyl)amino]-2,3-dihydro-1,3-dioxo-1H-benz[de]iso-quinoline-5,8-disulfonic acid dilithium salt}; azine dyes, such as Janus Green B {3-(diethylamino)-7-[[4-(dimethyl-amino)phenyl]azo]-5-phenylphenazinium chloride}; cyanine dyes, such as Indocyanine Green {CardioGreen or Fox Green; 2-[7-[1,3-dihydro-1,1-dimethyl-3-(4-sulfobutyl)-2H-benz[e]indol-2-ylidene]-1,3,5-heptatrienyl]-1,1-dimethyl-3-(4-sulfobutyl)-1H-benz[e]indolium hydroxide inner salt sodium salt}; indigo dyes, such as Indigo {Indigo Blue or Vat Blue 1; 2-(1,3-dihydro-3-oxo-2H-indol-2-ylidene)-1,2-dihydro-3H-indol-3-one}; coumarin dyes, such as 7-hydroxy-4-methyl-coumarin (4-methylumbelliferone); benzimidazole dyes, such as Hoechst 33258 [bisbenzimide or 2-(4-hydroxyphenyl)-5-(4-methyl-1-pipera-zinyl)-2,5-bi-1H-benzimidazole trihydro-chloride pentahydrate]; paraquinoidal dyes, such as Hematoxylin {Natural Black 1; 7,11b-dihydrobenz[b]-indeno[1,2-d]pyran-3,4,6a,9,10(6H)-pentol}; fluorescein dyes, such as Fluoresceinamine (5-aminofluorescein); diazonium salt dyes, such as Diazo Red RC (Azoic Diazo No. 10 or Fast Red RC salt; 2-methoxy-5-chlorobenzenediazonium chloride, zinc chloride double salt); azoic diazo dyes, such as Fast Blue BB salt (Azoic Diazo No. 20; 4-benzoylamino-2,5-diethoxybenzene diazonium chloride, zinc chloride double salt); phenylenediamine dyes, such as Disperse Yellow 9 [N-(2, 4-dinitro-phenyl)-1,4-phenylenediamine or Solvent Orange 53]; diazo dyes, such as Disperse Orange 13 [Solvent Orange 52; 1-phenylazo-4-(4-hydroxyphenylazo)-naphthalene]; anthra-quinone dyes, such as Disperse Blue 3 [Celliton Fast Blue FFR; 1-methylamino-4-(2-hydroxyethylamino)-9,10-anthraquinone], Disperse Blue 14 [Celliton Fast Blue B; 1,4-bis(methylamino)-9,10-anthraquinone], and Alizarin Blue Black B (Mordant Black 13); trisazo dyes, such as Direct Blue 71 {Benzo Light Blue FFL or Sirius Light Blue BRR; 3-[(4-[(4-[(6-amino-1-hydroxy-3-sulfo-2-naphthalenyl)azo]-6-sulfo-1-naphthalenyl)-azo]-1-naphthalenyl)azo]-1,5-naphthalenedisulfonic acid tetrasodium salt}; xanthene dyes, such as 2,7-dichloro-fluorescein; proflavine dyes, such as 3,6-diaminoacridine hemisulfate (Proflavine); sulfonaphthalein dyes, such as Cresol Red (o-cresolsulfonaphthalein); phthalocyanine dyes, such as Copper Phthalocyanine {Pigment Blue 15; (SP-4-1)-[29H,31H-phthalocyanato(2-)-$N^{29},N^{30},N^{31},N^{32}$]-copper}; carotenoid dyes, such as trans-β-carotene (Food Orange 5); carminic acid dyes, such as Carmine, the aluminum or calcium-aluminum lake of carminic acid (7-a-D-glucopyranosyl-9,10-dihydro-3,5,6,8-tetrahydroxy-1-methyl-9,10-dioxo-2-anthracene-carbonylic acid); azure dyes, such as Azure A [3-amino-7-(dimethylamino)phenothiazin-5-ium chloride or 7-(dimethyl-amino)-3-imino-3H-phenothiazine hydrochloride]; and acridine dyes, such as Acridine Orange [Basic Orange 14; 3,8-bis(dimethylamino)acridine hydrochloride, zinc chloride double salt] and Acriflavine (Acriflavine neutral; 3,6-diamino-10-methylacridinium chloride mixture with 3,6-acridine-diamine).

Suitable colorants for use in the present invention also include a family of subphthalocyanine compounds having the following general formula:

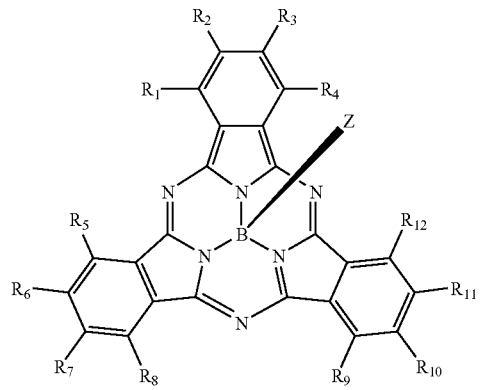

wherein $R_1$ to $R_{12}$ and Z each independently represent —H; a halogen; an alkyl group; a substituted alkyl group; an aryl group; a substituted aryl group; an alkoxide group; a phenoxy group; a substituted phenoxy group; an alkyl sulfide; an aryl sulfide; a nitrogen-containing group; a sulfonic acid; a sulfur-containing group; —OR', —NR'R", or —SR', wherein R' and R" each independently represent an alkyl group, a substituted alkyl group, an aryl group, or a substituted aryl group. In accordance with the present invention, $R_1$ to $R_{12}$ each independently represent —H, a halogen, an alkyl group, a nitrogen-containing group, or a sulfur-containing group. Typically, $R_1$ to $R_{12}$ each independently represent —H, chlorine, bromine, fluorine, iodine, a tert-butyl group, —$NO_2$, —$SO_3H$, —$SO_3Na$, —$SO_3Cl$, or —$SO_3Cl^-$ $pyH^+$.

Suitable Z substituents may be selected from a variety of substituents, which provide desirable properties to the resulting subphthalocyanine compound. In accordance with the present invention, Z may comprise a moiety, which stabilizes the subphthalocyanine compound; a moiety, which renders the subphthalocyanine compound water soluble; or a moiety, which stabilizes and renders the subphthalocyanine water soluble. Examples of suitable Z include, but are not limited to, a hydroxyl group; a halogen; an alkyl group; an alkoxy group; an ether group; a polyol group; an aromatic group; a substitute aromatic group; a nitrogen-containing group; a sulfur-containing group; —OR', —NR'R", or —SR', wherein R' and R" each independently represent an alkyl group, a substituted alkyl group, an aryl group, or a substituted aryl group. Typically, Z is selected from—though not limited to—one of the following moieties:

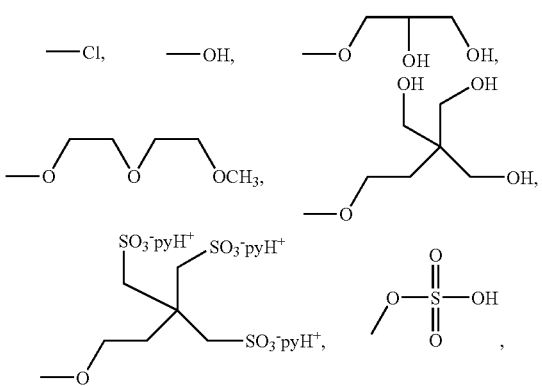

-continued

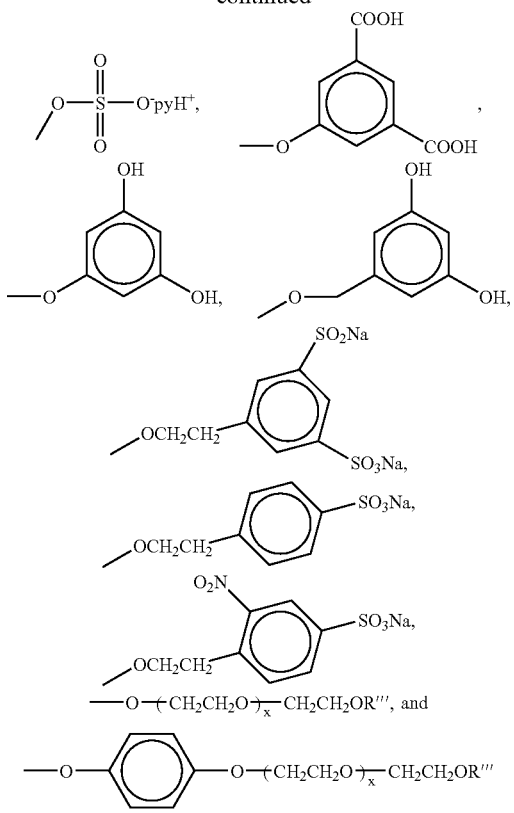

where x is an integer from 3 to 30, and R''' is a hydrogen or an alkyl group having up to six carbon atoms.

By selecting particular "R" and "Z" groups, subphthalocyanine compounds having superior lightfastness properties are available. In one embodiment of the present invention, subphthalocyanine compounds having superior lightfastness properties are used. In these subphthalocyanine compounds given by the above-described general formula, $R_1$ to $R_{12}$ each independently represent —H or a halogen; and Z represents a halogen, —OR', —NR'R", or —SR', wherein R' and R" each independently represent an alkyl group, a substituted alkyl group, an aryl group, or a substituted aryl group.

Subphthalocyanine compounds suitable for use in the present invention include, but are not limited to, the following compounds given below, wherein

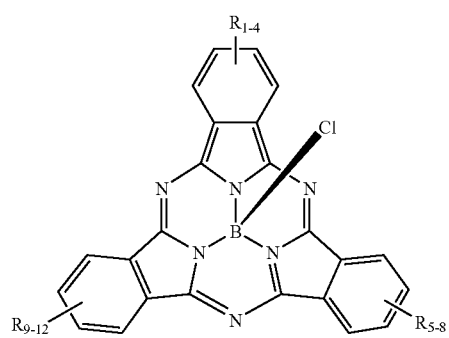

-continued

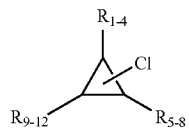

and wherein abbreviations such as $R_{1-4}$ represent the substituents $R_1$ to $R_4$:

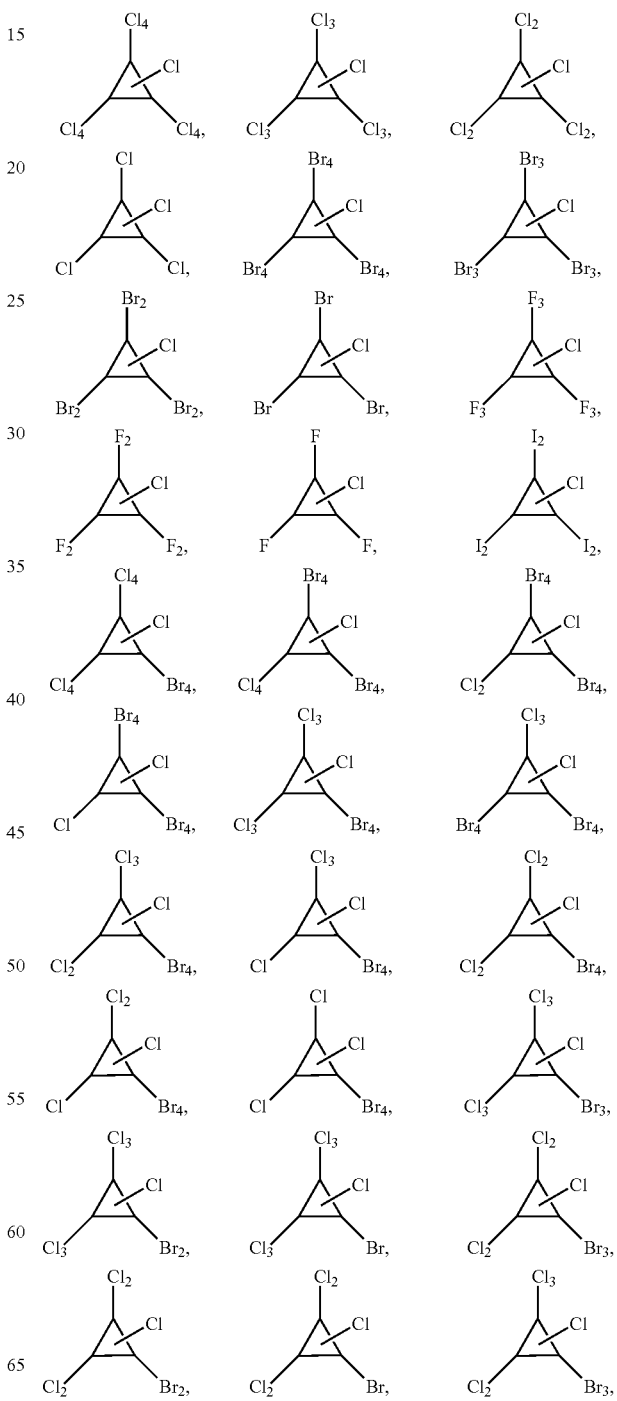

-continued

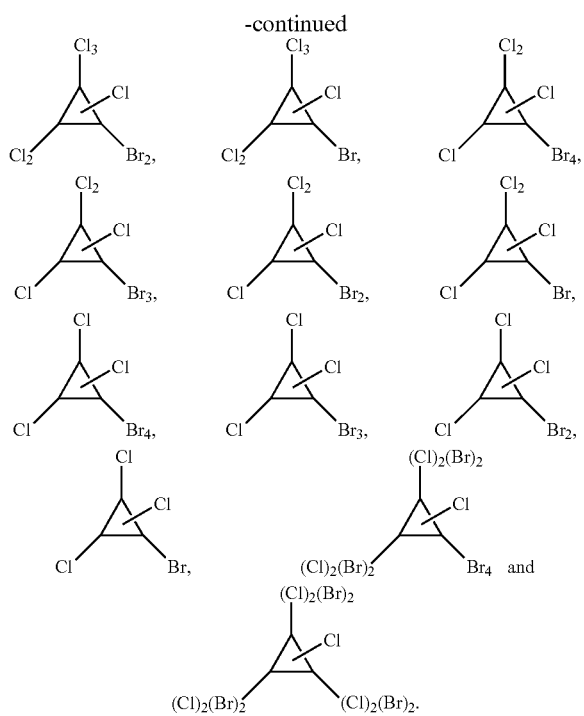

In a further aspect of the present invention, two subphthalocyanine compounds are reacted with a third reactant to obtain a colorant compound having the following general formula:

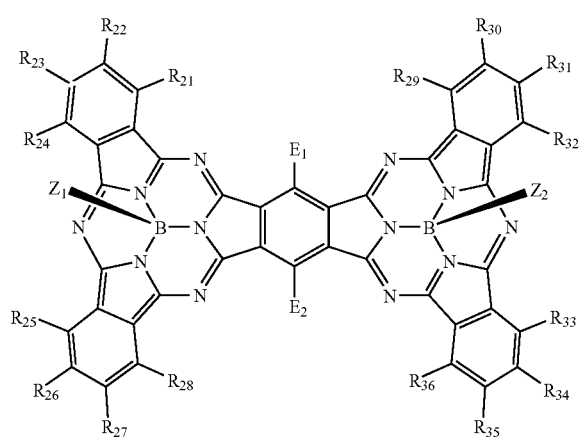

wherein $R_{21}$ to $R_{36}$, $Z_1$, and $Z_2$ each independently represent moieties as described above with respect to $R_1$ to $R_{12}$ and Z. In the formation of the above compound, the third reactant may be selected from 1,3,4,6-tetracyanobenzene or 1,3,4,6-tetracyanobenzene further substituted with one or more electron-withdrawing groups, $E_1$ and $E_2$. Suitable electron-withdrawing groups include, but are not limited to, $—NO_2$.

In a further aspect of the present invention, the lightfastness properties of the subphthalocyanine dye may be greatly improved to archival levels by the presence of a perfluoroporphine. The present invention encompasses both the physical mix and the covalent attachment of the perfluoroporphine and the subphthalocyanine dye. For example, when the subphthalocyanine dye shown below (where $R_1$ to $R_{12}$ are H, and Z is $—O-3,5-C_6H_3Me_2$) is physically admixed with copper-meso-perfluorotetraphenylporphine (abbreviated $CuF_{20}TPP$) in a polymer matrix, the absorption ($\lambda_{MAX}$) of the subphthalocyanine dye did not change even after exposure for 10 hours to radiation from an Atlas Suntest CPS+ xenon lamp. Thus, this invention encompasses both the admixture of subphthalocyanine dye and perfluoroporphine such as $CuF_{20}TPP$ and the covalent attachment of these moieties.

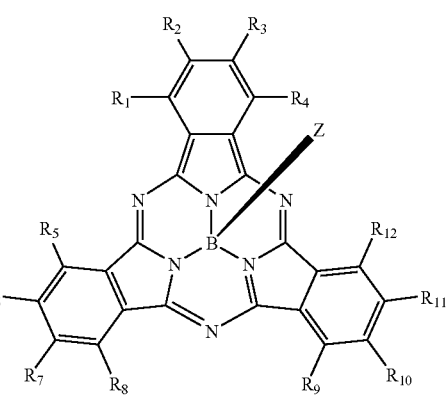

The covalent attachment of the perfluoroporphine and the subphthalocyanine dye moieties is represented by the complex shown above, wherein Z comprises a copper-meso-perfluorotetraphenylporphine and a "linker" between the subphthalocyanine dye portion of the molecule and a phenyl ring of porphine. Therefore, in this example, Z can represent $—NXCuF_{19}TPP$, $—PXCuF_{19}TPP$, $—AsXCuF_{19}TPP$, $—BXCuF_{19}TPP$, $—OCuF_{19}TPP$, $—SCuF_{19}TPP$, $—CX_2CuF_{19}TPP$, $—SiX_2CuF_{19}TPP$, $—GeX_2CuF_{19}TPP$, $—SnX_2CuF_{19}TPP$, and the like, where X can independently represent H, alkyl, aryl, halide, alkenyl, cycloalkyl, heterocycloalkyl, aryl, heteroaryl, alkoxide, phenoxide, substituted derivatives thereof, and so forth. These complexes are prepared by synthetic methods known to one of ordinary skill in the art. For example, the complex in which Z is $—NHCuF_{19}TPP$ was synthesized by reacting the bromo subphthalocyanine with the amino derivative of the perfluroporphine to obtain the subphthalocyanine-$NHCuF_{19}TPP$ compound.

The above-described subphthalocyanine compounds may be used as a colorant, alone or in combination with one or more other colorants. The subphthalocyanine compounds may be incorporated into ink compositions, which may form an ink set including yellow, blue, black, and magenta inks.

The present invention also relates to colorant compositions having improved stability, wherein the colorant comprises one or more of the above-described subphthalocyanine compounds. In accordance with the present invention, one or more of the subphthalocyanine colorants are admixed with or covalently bonded to a colorant stabilizer. The colorant stabilizer may be one or more colorant stabilizers disclosed in the following U.S. patent application Ser. No. 08/563,381 filed Nov. 28, 1995, now abandoned; Ser. No. 08/589,321 filed Jan. 22, 1996, pending; and Ser. No. 08/788,863 filed Jan. 23, 1997, pending; and U.S. Pat. Nos. 5,782,963; 5,855,655; 5,885,337; and 5,891,229; all of which are assigned to Kimberly-Clark Worldwide, Inc., the entirety of which are incorporated herein by reference. Optionally, the new subphthalocyanine compounds may be associated with a molecular includant, chelating agent, or other material to improve solubility and/or interaction of the subphthalocyanine compound and any colorant stabilizers present. Suitable molecular includant, chelating agent, and other composition materials are also disclosed in the above-referenced U.S. patent applications and issued patents.

One aspect of the present invention involves the above-described subphthalocyanine compound covalently bonded to a colorant stabilizer in the form of a porphine. Suitable porphines are disclosed in the above-referenced in the above cited U.S. patent applications and issued patents. In accordance with this aspect of the present invention, the porphine is covalently bonded to the subphthalocyanine compound at Z, $Z_1$, and/or $Z_2$. In a further embodiment of the present invention, two subphthalocyanine compounds are covalently bonded to one another. In this aspect, it is typical for one subphthalocyanine compound to be bonded to the other subphthalocyanine compound at Z, $Z_1$ and/or $Z_2$.

In one aspect of the present invention, one or more colorant stabilizers are associated with the colorant. By incorporating one or more colorant stabilizers into the solution described above, colorant stabilizers may be associated with the charged polymer along with the colorant. Suitable colorant stabilizers for use in the present invention include, but are not limited to, colorant stabilizers disclosed in the above-cited U.S. patent applications and issued patents.

In a further embodiment of the present invention, suitable colorant stabilizers include, but are not limited to, a porphine, a metal, a metal salt, a molecular includant or a combination thereof.

Suitable porphines include, but are not limited to, porphines having the following structure:

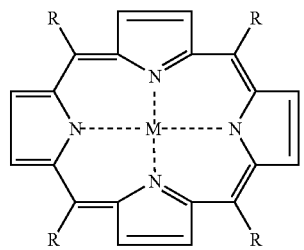

wherein R is any proton-donating moiety and M is iron, cobalt or copper. Typically, R is $SO_3H$,

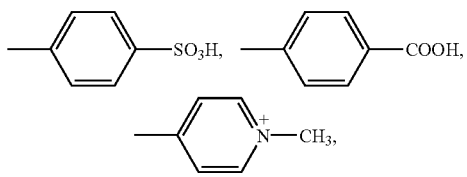

COOH, $R_1$COOH wherein $R_1$ is an alkyl group of from 1 to 6 carbons, or the corresponding salt thereof.

In accordance with the present invention, the colorant stabilizer is represented by one or more porphines such as Cu-meso-tetra-(4-sulfanatophenyl)-porphine (designated CuTPPS4) and Cu-meso-tetra-(N-methyl-4-pyridyl)-porphine (designated CuTMPS4), having the following structure:

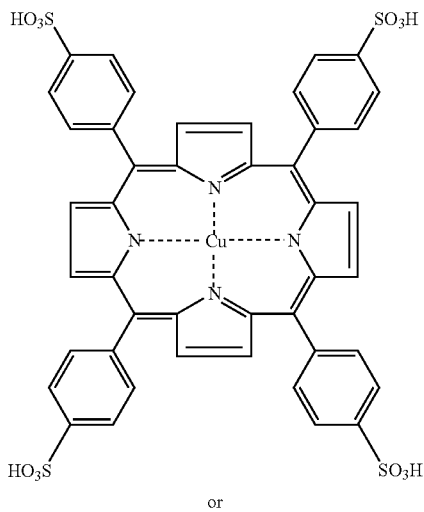

or

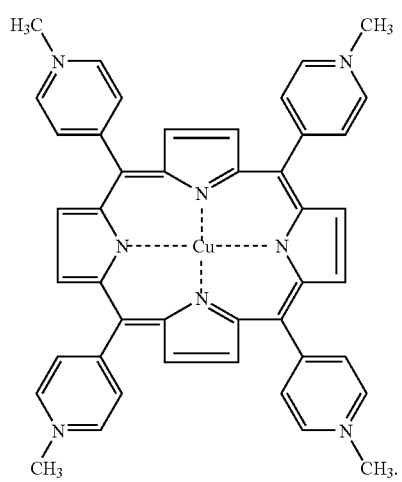

In the above-described porphines, the copper ion can also be substituted with an iron or cobalt ion. It is also understood that in the case of FeTPPS4, CuTPPS4 or CoTPPS4, the sulfuric acid moieties may be substituted with salts when in solution, such as sodium salts.

In another aspect of the present invention, the nanoparticles comprise a colorant and a colorant stabilizer in the form of a metal or metal salt, such as a lanthanide or lanthanide salt. Although lanthanides and lanthanide salts are useful metals, other metals, may also be used such as magnesium, iron, zinc, and other transition metals. To improve the solubility of the metal or metal salt in solution, metal solubility-enhancing agents may be added. Useful metal solubility-enhancing agents include, but are not limited to, chelating agents, including, but not limited to, EDTA (ethylenediaminetetraacetic acid) or EGTA (ethylene glycol-bis(β-aminoethyl ether)).

In a further aspect of the present invention, the nanoparticles comprise a colorant in combination with a porphine and a lanthanide, such as europium. Although europium and europium salts are desired lanthanides, other lanthanides, may also be used.

Although not wanting to be limited by the following hypothesis, it is theorized that, in addition to the protection provided by the polymeric coating on the nanoparticle, the above colorant stabilizing compounds act by quenching the excited state of a dye molecule within the nanoparticle by efficiently returning it to a ground state. This quenching process reduces the likelihood of an oxidative or other chemical reaction occurring which would render the dye chromophore colorless.

The quenching effect can occur by a number of processes. One such process is referred to as the heavy atom effect (internal or external) in which atoms with a high atomic number, such as iodine, xenon and lanthanides, can effect the excited electronic transitions of the dye molecule by allowing here to fore forbidden electronic transitions to occur and by decreasing the excited state lifetimes. This effect permits the rapid return of the dye to its ground state.

Another quenching process involves back electron transfer. In this case, quenching of the excited dye molecule occurs through sequential electron transfer. The additive or quencher, and dye form an ion pair through electron donation within which back electron transfer leads to an overall deactivation of the excited energy donor, i.e., the dye.

Another quenching process involves a condition in which the quencher (additive) molecule has an excited energy state lower than the excited dye. In this case, it may be possible to transfer the excited energy to the quencher thereby allowing the dye molecule to return to its ground state. These mechanisms are more fully discussed in *Chemistry and Light*, Suppan, P., Published by The Royal Society of Chemistry, 1994, pgs 65-69 which is incorporated herein by reference.

In some aspects of the present invention, the colorant and/or colorant stabilizer of the nanoparticle is associated with a molecular includant. The term "associated" in its broadest sense means that the colorant and/or colorant stabilizer is at least in close proximity to the molecular includant. For example, the colorant and/or colorant stabilizer may be maintained in close proximity to the molecular includant by hydrogen bonding, van der Waals forces, or the like. Alternatively, the colorant and/or colorant stabilizer may be covalently bonded to the molecular includant, although this normally is neither desired nor necessary. As a further example, the colorant and/or colorant stabilizer may be at least partially included within the cavity of the molecular includant.

The molecular includant can be inorganic or organic in nature. In certain instances, the chemical structure of the molecular includant is adapted to form a molecular inclusion complex. Examples of molecular includants are, by way of illustration only, clathrates or intercalates, zeolites, and cyclodextrins. Examples of cyclodextrins include, but are not limited to, α-cyclodextrin, β-cyclodextrin, γ-cyclodextrin, δ-cyclodextrin, hydroxypropyl β-cyclodextrin, hydroxyethyl β-cyclodextrin, hydroxyethyl α cyclodextrin, carboxymethyl α cyclodextrin, carboxymethyl β cyclodextrin, carboxymethyl γ cyclodextrin, octyl succinated α cyclodextrin, octyl succinated β cyclodextrin, octyl succinated γ cyclodextrin and sulfated β cyclodextrin and sulfated γ-cyclodextrin (Cerestar U.S.A., Incorporated, Hammond, Ind.).

The term "derivatized cyclodextrin" as used herein means a cyclodextrin having more than two leaving groups covalently coupled to each molecule of cyclodextrin. Examples of derivatized cyclodextrin includes, but is not limited to, hydroxypropyl β-cyclodextrin, hydroxyethyl β-cyclodextrin, hydroxyethyl α cyclodextrin, carboxymethyl α cyclodextrin, carboxymethyl β cyclodextrin, carboxymethyl γ cyclodextrin, octyl succinated α cyclodextrin, octyl succinated β cyclodextrin, octyl succinated γ cyclodextrin and sulfated β and γ-cyclodextrin. A useful derivatized cyclodextrin is ethylhydroxy β-cyclodextrin.

Useful molecular includants include, but are not limited to γ-cyclodextrin and β-cyclodextrin. In other embodiments, the molecular includant is an ethyl hydroxy β-cyclodextrin. Although not wanting to be bound by the following hypothesis, it is believed that the molecular includant inhibits the aggregation of the colorant molecule in solution. Other aggregation inhibitors that can be used in practicing the present invention are starches, pectins, amyloses, clathrates and the crown ethers. It is to be understood that the addition of derivatized cyclodextrins to a coated nanoparticle-forming solution for the purpose of inhibiting aggregation and/or stabilizing the dyes in the coated nanoparticle is considered one aspect of the present invention.

In addition to the colorant, optional colorant stabilizer, and optional molecular includant, the nanoparticle of the present invention also may contain functional additives components, depending upon the application for which it is intended, as long as the additional component does not negatively effect the dye molecule. Examples of such additional components include, but are not limited to, leuco dyes, charge carriers; stabilizers against thermal oxidation; viscoelastic properties modifiers; cross-inking agents; plasticizers; charge control additives such as a quaternary ammonium salt; flow control additives such as hydrophobic silica, zinc stearate, calcium stearate, lithium stearate, polyvinylstearate, and polyethylene powders; fillers such as calcium carbonate, clay and talc; surfactants; chelating agents; and TINUVIN® compounds; among other additives used by those having ordinary skill in the art. Charge carriers are well known to those having ordinary skill in the art and typically are polymer-coated metal particles. Useful surfactants include, but are not limited to, $C_{12}$ to $C_{18}$ surfactants such as cetyl trimethyl ammonium chloride and carboxymethylamylose. TINUVIN® compounds are a class of compounds produced by Ciba-Geigy Corporation, which includes benzophenones, benzotriazoles and hindered amines. Useful TINUVIN® compounds include, but are not limited to, 2-(2'-hydroxy-3'-sec-butyl-5'-tert-butylphenyl)-benzotriazole, poly-(N-β-hydroxyethyl-2,2,6,6-tetramethyl-4-hydroxy-piperidyl succinate and 2-(2'-hydroxy-3',5'-ditertbutylphenyl)-5-chloro-benzotriazole. The identities and amounts of such additional components in the colored composition are well known to one of ordinary skill in the art.

Another aspect of the present invention is directed towards the recording medium of the present invention containing a nanoparticle having a surface modifier or surface gloss modifying agent disposed upon the particle template. Examples of such surface modifiers include polyvinyl alcohol, polyvinyl pyrrolidone, polyethylene glycol, chitosans, polysiloxanes, polyacrylic acid, polysiloxane polyethylene oxide copolymer, polysiloxane polypropylene oxide copolymer, linear dextrins, cyclodextrins, combinations thereof, or copolymers thereof. The addition of the surface modifiers results in a surface with enhanced properties, such as glossy, maft, dull or textured finishes.

Examples of Applications for Nanoparticle Based Inks

The present invention is also directed to colorant compositions containing the above-described nanoparticles. The colorant composition may comprise an aqueous or non-aqueous medium, although an aqueous medium is useful for applications which employ liquid printing mediums. The colorant compositions of the present invention contain nanoparticles, as well as, any of the above-described colorant stabilizers and additives. For example, the colorant composition may contain the above-described nanoparticle in combination with any of the following additives: a second colorant; a colorant stabilizer, such as a porphine; a molecular includant; a pre-polymer; and any additional components as described above.

The present invention encompasses recording mediums such as ink jet inks comprising the nanoparticles disclosed herein. Inks used in ink jet printers are described in U.S. Pat. No. 5,681,380, assigned to Kimberly-Clark Worldwide, Inc., which is incorporated herein by reference in its entirety. Ink jet inks will usually contain water as the principal solvent, preferably deionized water in a range of between about 20 to about 95 percent by weight, various co-solvents in an amount of between about 0.5 and about 20 percent by weight, and the nanoparticles of the present invention.

Various co-solvents may also be included in the ink formulation. Examples of such co-solvents include a lactam such as N-methyl pyrrolidone. However, other examples of optional co-solvents include N-methylacetamide, N-methylmorpholine-N-oxide, N,N-dimethylacetamide, N-methyl formamide, propyleneglycol-monomethylether, tetramethylene sulfone, and tripropyleneglycolmonomethylether. Still other solvents which may be used include propylene glycol and triethanolamine (TEA). If an acetamide-based cosolvent is also included in the formulation it is typically present at about 5 percent by weight, within a range of between about 1.0-12 percent by weight.

Optionally, one or more humectants in an amount between about 0.5 and 20 percent by weight may be included in the ink formula. Further, other co-solvents in an amount of between about 1.0 and about 7.0 percent by weight may be added to the formulation. Additional humectants for optional use in the formulation include, but are not limited to, ethylene glycol, diethylene glycol, glycerine, and polyethylene glycol 200, 400, and 600, propane 1,3 diol, other glycols, a propyleneglycolmonomethyl ether, such as Dowanol PM (Gallade Chemical Inc., Santa Ana, Calif.), polyhydric alcohols, or combinations thereof.

Other additives may also be included to improve ink performance, such as a chelating agent to sequester metal ions that could become involved in chemical reactions that could spoil the ink over time, for example for use with metal complex dyes, a corrosion inhibitor to help protect metal components of the printer or ink delivery system, a biocide or biostat to control unwanted bacterial, fungal, or yeast growth in the ink, and a surfactant to adjust the ink surface tension. However, the use of a surfactant may be dependent on the type of printhead to be used. If a surfactant is included, it is typically present in an amount of between about 0.1 to about 1.0 percent by weight. If a corrosion inhibitor is included, it is typically present in an amount between about 0.1 and about 1.0 percent by weight. If a biocide or biostat is included, it is typically present in an amount between about 0.1 and about 0.5 percent by weight.

If a biocide or biostat is added to the ink formulation, it may be exemplified by Proxel GXL (Zeneca Corporation, Wilmington, Del.). Other examples include Bioban DXN (Angus Chemical Company, Buffalo Grove, Ill.). If a corrosion inhibitor is added to the formulation, it may be exemplified by Cobratec (PMC Specialty Group Distributing of Cincinnati, Ohio). Alternate corrosion inhibitors include sodium nitrite, triethanolamine phosphate, and n-acyl sarcosine. Still other examples include benzotriazole (Aldrich Chemical Company, Milwaukee, Wis.). If a surfactant is included in the formulation, it is typically a nonionic surfactant exemplified by Surfynol 504 (Air Products and Chemicals, Inc., Allentown, Pa.). Still other examples include Surfynol 465, and Dynol 604 also available from Air Products. If a chelating agent is included in the formulation it may be exemplified by an ethylene diaminetetraacetic acid (EDTA). Other additives such as pH stabilizers/buffers, (such as citric acid and acetic acid as well as alkali metal salts derived therefrom), viscosity modifiers, and defoaming agents such as Surfynol DF-65, may also be included in the formulation, depending on the product application.

The recording media or colorant compositions of the present invention may be applied to any substrate to impart a color to the substrate. The substrates to which the nanoparticles may be applied include, but are not limited to, paper, wood, a wood product or composite, woven fabric, nonwoven fabric, textile, plastic, glass, metal, human skin, animal skin, leather and the like. Examples of suitable substrates are disclosed in the U.S. patent applications and issued patents cited above. In one aspect of the present invention, nanoparticles are applied to a textile article, such as clothing. A very thin coating having a thickness of about one nanoparticle may be applied to a textile surface.

In a representative laboratory laundering experiment, a small (about 1 inch by 2 inch) piece of fabric of various materials was treated with the colorant suspension of the present invention. Typically, the sample was immersed in a suspension of the colorant for 15-20 seconds, removed from the colorant and rinsed well with water, and dried under vacuum at ambient temperature. The dry, colored sample of fabric was then subjected to the AATCC (American Association of Textile Chemists and Colorists) 61-2A accelerated laundering test. The AATCC 61-2A test for evaluating colorfastness should show color change similar to that produced by five commercial launderings at 38 ±3° C. (100±5° F.) or by five home machine launderings at medium or warm setting in this same temperature range. The fabric sample was washed in 150 mL of water at 49° C. (120° F.) with 0.25% SYNTHRAPOL™ detergent, along with 50 (0.6 cm) steel ball bearings. Wash time was 45 min, in a canister being rotated at a rate of 40 rpm. The laundered sample was then washed with water and dried, and the color change and color staining were determined.

Two methods of determining the durability of the printed ink by color loss were employed. The first method is color loss in $\Delta E^*$ units, which measures the spectroscopic change in the 3D color space. The second method is color loss using a gray scale for color change, which is a visible comparison with color standards. The first ($\Delta E^*$) method measures the change in the 3D color space, it is generally considered a more accurate measurement of the loss of color than the second method. However, the second (gray scale) method is used extensively in the fabric industry.

The color loss by the $\Delta E^*$ method involves L*a*b* color values measurements (CIE 1976 Commission Internationale de l'Eclairage) and optical density measurements which were made on the printed textile substrates using an X-Rite 938 Spectrodensitometer (D65/10°) using CMY filters, in accordance with the operator's manual. The X-Rite Spectrodensitometer was obtained from the X-Rite Corporation of Grandville, Mich. Average optical densities were taken as the sum of the average of three measurements using each filter. Delta E* is calculated in accordance with the following equation:

$$\Delta E^* = SQRT[(L^*\text{standard} - L^*\text{sample})^2 + (a^*\text{standard} - a^*\text{sample})^2 + b^*\text{standard} - b^*\text{sample})^2]$$

The higher the $\Delta E^*$, the greater the change in color intensity. Unless the color's intensity is increased by a curing step, a large increase in ΔE* would typically be indicative of fading. The testing was in accordance with ASTM DM 224-93 and ASTM E308-90. Where values for ΔE* are less than 3.0, it is generally accepted that such color change cannot be observed with the human eye. A detailed description of spectrodensitometer testing is available in *Color Technology in the Textile Industry*, 2$^{nd}$ Edition, Published 1997 by AATCC (American Association of Textile Chemists & Colorists).

Color loss using a gray scale constitutes an AATCC Gray Scale which is used in visual evaluations of the changes in color of textiles resulting from colorfastness tests. Gray Scale color loss is graded between 1 (much changed or heavily stained) and 5 (negligible color change or no change or staining). According to AATCC, the colorfastness grades of the scale steps and the corresponding total color differences and tolerances used are determined by the CIE L*a*b* (CIELAB) formula. Colorfastness grade 5 is represented on the scale by two reference chips mounted side by side, neutral gray in color and having a Y tristimulus value of 12+0.2. Colorfastness grades 4.5 to 1, inclusive, are represented by reference chips like those used in Step 5 paired with lighter neutral gray chips of similar dimensions and gloss. Specific tolerances and instructions for use of the scale are given in AATCC Evaluation Procedure 1. The Gray Scale for Color Change is used in all colorfastness tests; including AATCC Test Methods 6, 8, 15, 16, 23, 61, 101, 104, 106, 107, 109, 116, 117, 119, 120, 125, 126, 129, 131, 132, 133, 139, 157, 162, 163, 164, 165, 172, 173, 177, 180, 181.

Additionally, some printed fabrics were examined for their colorfastness to crocking, by the rotary vertical crockmeter method (AATCC Test Method 116-1996). This test method, according to the AATCC standard, is designed to determine the amount of color transferred from the surface of colored textile materials to other surfaces by rubbing. It is applicable to textiles made from all fibers in the form of yarn or fabric, whether the textile is dyed, printed or otherwise colored and especially to prints where the singling out of areas smaller than possible to test with the standard AATCC Crockmeter (AATCC Test Method 8) is required. Thus, test procedures employing test squares of printed textile, whether dry or wet with water or other liquids are within the scope of this method. In this test, a test specimen held at the base of the Rotary Vertical Crockmeter is rubbed with standard test squares under controlled conditions. Subsequently, color transferred to the test squares is assessed by comparison with the Gray Scale for Staining or AATCC Chromatic Transference Scale.

Table 3 records the results of the AATCC 61-2A accelerated laundering test for various fabric samples and colorants of the present invention, as compared to unlaundered samples, with Gray Scale color change measured on untreated cotton fabric. Samples 1 ("70-4M magenta") and 2 ("70-3M magenta") constitute fabric printed with melamine resin nanoparticles coated with rhodamine B dye (magenta), that differ only in the ink composition (e.g. surfactants) and not the nanoparticles. Thus, 70-4M used 1,3-propanediol (neutral), while 70-3M used a 50:50 mixture of 1,3-propanediol and N,N-dimethyl-morpholine N-oxide (charged). Thus, highly polar ink additives are less useful than only slightly polar additives. Sample 3 is silica (SNOWTEX ™C) with a CIBACRON® yellow P-6GS dye-PE(+) coating. The magenta nanoparticles (melamine resin coated with rhodamine B) have a positive zeta potential, while the yellow nanoparticles (silica coated with CIBACRON® yellow P-6GS dye-PE(+)) have a negative zeta potential (−11 mV), as evidenced by the greater lightfastness of the magenta particles adhering to cotton fabric with a negative streaming potential.

TABLE 3

Gray Scale Colorfastness by Grade to AATCC 61-2A Accelerated Laundering

| Sample 1 | | |
|---|---|---|
| Color Change | | 3.5 |
| Color Staining | Acetate | 4.5 |
| | Cotton | 4 |
| | Nylon | 3 |
| | Polyester | 3.5 |
| | Acrylic | 4.5 |
| | Wool | 4 |
| Sample 2 | | |
| Color Change | | 3 |
| Color Staining | Acetate | 5 |
| | Cotton | 3.5 |
| | Nylon | 3.5 |
| | Polyester | 3.5 |
| | Acrylic | 4.5 |
| | Wool | 4 |
| Sample 3 | | |
| Color Change | | 2.5 |
| Color Staining | Acetate | 4.5 |
| | Cotton | 4.5 |
| | Nylon | 4.5 |
| | Polyester | 3.5 |
| | Acrylic | 4.5 |
| | Wool | 4 |

In a further aspect of the present invention, the nanoparticle based inks are present in a carrier, the nature of which is well known to those having ordinary skill in the art. For many applications, the carrier will be a polymer, typically a thermosetting or thermoplastic polymer, with the latter being the more common. Examples of suitable thermosetting and thermoplastic polymers are disclosed in the cited U.S. patents and patent applications, assigned to Kimberly-Clark Worldwide, Inc., cited above. One suitable application is the incorporation of nanoparticle into a polymer coating of a heat transfer product, such as is used for transferring graphic images onto clothing.

This invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention. For example, it is to be understood that the amounts of reagents used in the following examples are approximate and that those skilled in the art might vary these amounts and ratios without departing from the spirit of the invention. In the Examples, all parts are parts by weight unless stated otherwise.

EXAMPLES

Example 1

Preparation of Polyelectrolyte-Magenta Dye-Coated Silica Nanoparticles

A charged polymer-dye solution was first prepared as follows. A 20 mL sample of $10^{-2}$ M poly(butyl acrylate-methacryloxyethyl trimethylammonium bromide charged polymer was stirred while a solution of 0.06 g of acid red 52 (AR52) was added at room temperature. This solution was stirred for 20 min. The charged polymer-dye solution prepared in this fashion was then added to a suspension of 0.1% w/w colloidal silica (prepared from commercially available SNOWTEX™ C) which also contained 0.5 M NaCl. After this mixture was stirred for 20 min, the mixture was centrifuged (10,000 g) and the resulting magenta-colored powder was washed with water 3 times and centrifuged each time. The magenta powder from this experiment was suspended in water and placed in a dialysis bag overnight (ca. 16 h), with water as the partition. No dye was observed to diffuse out of the bag in this dialysis experiment.

Example 2

Preparation of a Polyelectrolyte Coated Silica Nanoparticles

To a stirred suspension of 0.1% w/w colloidal silica (SNOWTEX™ C) in a 0.5 M salt solution was slowly added a 0.01 M charged polymer solution, comprising polybutyl acrylate-methacryloxyethyl trimethylammonium bromide. This mixture was centrifuged (10,000 g) and the resulting washed with water 3 times. This reaction generated a white powder comprising a charged polymer layered nanoparticle.

Example 3

Dialysis Control Experiment

To examine a control dialysis experiment to compare with the results in Example 1, a solution containing only Acid Red 52 dye (AR52) was placed in a dialysis bag overnight with water as a partition. In contrast to the nanoparticle suspension dialysis experiment in Example 1, dye was observed to dialyze out of the bag overnight (ca. 16 h) in this control.

Example 4

Preparation of Rhodamine B-Coated Silica Nanoparticles

A 0.02 g sample of Rhodamine B dye was added to 40 mL of a 20% w/w suspension of colloidal silica (SNOWTEX™ C). This composition was stirred for 20 min after which the resulting mixture was placed in a dialysis bag with water as a partition. After 16 hr, all the color of the Rhodamine B dye was still in the dialysis bag. This experiment clearly demonstrates that the positively-charged Rhodamine B dye is tightly bound to the highly negatively charged silica nanoparticle. A suspension of the Rhodamine B-layered silica nanoparticle prepared in this fashion exhibited an absorption maximum ($\lambda_{max}$) at 556 nm (nanometers). This absorption maximum constitutes a 2 nm shift from the 554 nm $\lambda_{max}$ of a solution of Rhodamine B dye that is not layered onto the surface of silica nanoparticles. A 40% wt/wt aqueous suspension of silica nanoparticles with Rhodamine B adsorbed has been successfully inkjetted onto a fabric.

Example 5

Reaction of Acid Red 52 with Silica Nanoparticles

A 0.02 g sample of Acid Red 52 (AR52) dye was added to 40 mL of a 20% w/w suspension of colloidal silica (SNOWTEX™ C). This composition was stirred for 20 min after which the resulting mixture was placed in a dialysis bag with water as a partition. After 16 hr, color from the AR52 dye was in the beaker, not in the dialysis bag. The absorption spectrum of a mixture AR52 and colloidal silica exhibited an absorption maximum ($\lambda_{max}$) at 565 nm (nanometers), identical to the 565 nmn $\lambda_{max}$ of a solution of AR52 dye alone. These experiments clearly demonstrate that the negatively-charged AR52 dye was not associated with the highly negatively charged silica nanoparticle.

Example 6

Preparation of Highly Loaded Polyelectrolyte-Dye-Coated Silica Nanoparticles

A charged polymer-dye solution was prepared by stirring a 20 mL sample of $10^{-2}$ M poly(butyl acrylate-methacryloxyethyl trimethylammonium bromide charged polymer while a solution of 0.24 g of acid red 52 (AR52) was added at room temperature. This solution was stirred for 20 min. The charged polymer-dye solution prepared in this fashion was then added to a suspension of 0.1% w/w colloidal silica (prepared from commercially available SNOWTEX™ C). After this mixture was stirred for 40 min, it was centrifuged (10,000 g) and the resulting, magenta-colored powder was washed with water 3 times and centrifuged each time. The magenta powder from this experiment was significantly darker than that obtained from Example 1.

Example 7

Preparation of Polyelectrolyte-Yellow Dye-Coated Silica Nanoparticles

A charged polymer-dye solution was first prepared as follows. A 250 mL sample of $10^{-2}$ M poly(butyl acrylate-methacryloxyethyl trimethylammonium bromide charged polymer was stirred while a 0.30-g sample of CIBACRON® Yellow P-6GS was added at room temperature. This solution was stirred for 20 min. The charged polymer-dye solution prepared in this fashion was then added to 12.5 mL of a 20% suspension of colloidal silica (SNOWTEX™ C) which also contained 0.5 M NaCl. After this mixture was stirred for 20 min, the mixture was centrifuged (10,000 g) and the resulting yellow-colored powder was washed with water 3 times and centrifuged each time. The yellow powder from this experiment was suspended in water and placed in 2 dialysis bags overnight (ca. 16 h) with water as the partition. A trace of yellow dye was observed to come out of the bag in this dialysis experiment.

Example 8

Preparation of Polyelectrolyte-Cyan Dye-Coated Silica Nanoparticles

A charged polymer-dye solution was first prepared as follows. A 250 mL sample of $10^{-2}$ M poly(butyl acrylate-methacryloxyethyl trimethylammonium bromide charged polymer was stirred while a 0.49-g sample of copper phthalocyanine tetrasulfonic acid was added at room temperature. This solution was stirred for 20 min. The charged polymer-dye solution prepared in this fashion was then added to 12.5 mL of a 20% wt/wt suspension of colloidal silica (SNOWTEX™ C) which also contained 0.5 M NaCl. After this mixture was stirred for 20 min, the mixture was centrifuged (10,000 g) and the resulting cyan-colored powder was washed with water 3 times and centrifuged each time. The cyan powder from this experiment was suspended in water and placed in 2 dialysis bags overnight (ca. 16 h) with water as the partition. A trace of cyan dye was observed to come out of the bag in this dialysis experiment.

Example 9

Addition of a Second Polyelectrolyte Layer on Magenta Silica Nanoparticles

The suspension of magenta nanoparticles from the dialysis bag of Example 1 was placed in an Erlenmeyer flask and stirred. To this solution was added a sufficient amount of poly(styrene sulfonic acid), sodium salt as a $10^{-2}$ M solution in deionized water to coat the particle. After stirring this mixture for 20 min, the sample was placed in a new dialysis bag overnight (ca. 16 h) with water as the partition to remove any unassociated poly(styrene sulfonic acid).

Example 10

Addition of a Third Polyelectrolyte Layer on Magenta Silica Nanoparticles

A charged polymer-dye solution was prepared by stirring a 20 mL sample of $10^{-2}$ M poly(butyl acrylate-methacryloxyethyl trimethylammonium bromide charged polymer while a solution of 0.24 g of acid red 52 (AR52) was added at room temperature. This solution was stirred for 20 min. The charged polymer-dye solution prepared in this fashion was then added to a stirred suspension of magenta nanoparticles from the dialysis bag of Example 9 that had been removed from the bag and placed in an Erlenmeyer flask. After stirring this mixture for 20 min, the sample was placed in a new dialysis bag overnight (ca. 16 h) with water as the partition to remove any unassociated charged polymer-dye.

Example 11

Spray Coating Fabric with Magenta Silica Nanoparticles

The dialyzed suspension of magenta nanoparticles from Example 10 was sprayed onto a series of fabrics using a PREVAL® Sprayer (Precision Valve Corporation, New York), until the fabric appeared visibly coated with the spray. A mask or stencil comprising the trademark design of the Kimberly-Clark Worldwide Corporation allowed this design to be imprinted on the fabric. In a second series of experiments, a dialyzed suspension of magenta nanoparticles from Example 10 to which 2 drops (in 50 mL of suspension) of TRITON® X-100 had been added, to allow better coating of the fabric fibers. In both sets of experiments, chiffon, cotton poplin, Georgette, and silk were employed as fabric substrates.

Example 12

Inkjetting Cotton Fabric With Magenta Silica Nanoparticles

A suspension of 0.01% wt/wt silica (SNOWTEX™ C) was coated with 0.01 M charged polymer dye of acid red 52 (AR52) as described in Example 6. The suspension was dialyzed at a pH of 8.5. To the resultant aqueous suspension was added 1,3-propanediol (ca. 3% wt/wt), although most standard co-solvent and surfactant additives could be used. This ink mixture was stirred for 20 min, and then syringed into an HP Margarita inkjet cartridge. This ink composition was inkjet printed onto uncoated cotton fabric using a Colorspan DMII wide format printer. The suspension ink jetted well onto the cotton fabric to give a magenta print.

Example 13

Adsorption of a Non-Charged Polymer onto Silica Nanoparticles

A suspension of colloidal silica (SNOWTEX™ C), diluted with deionized water to 1% wt/wt silica nanoparticles in water, was treated with a 0.1% wt/wt solution of poly[N,N'-bis(2,2,6,6-tetramethyl-4-piperidinyl)-1,6-hexanediamine-co-2,4-dichloro-6-morpholino-1,3,5-triazine] (abbreviated PPMT, Aldrich Chemical Co. no. 41,324-0, CAS registry no. 82451-48-7). The zeta potential was measured before and after addition of the polymer, and found to change from −36 mV before addition, to +70 mV after addition. Zeta potential measurements were taken using a Zetapals Instrument (Brookhaven Instrument Corporation, Holtsville, N.Y.), by adding 1-3 drops of sample into a cuvet containing 1 mM KCl solution, using the instrument's default functions preset for aqueous solutions. This mixture was stirred for 40 minutes and then dialyzed overnight against pH 9, using 2000 molecular weight dialysis bags. This dramatic increase in measured zeta potential upon the addition of the PPMT polymer solution indicates the absorption of the non-charged polymer to the silica nanoparticle. This example also illustrates the incorporation of a UV stabilizer into a nanoparticle, as PPMT is a strong absorber of UV radiation.

Example 14

Adsorption of a Non-Charged Polymer onto Silica Nanoparticles at High Concentrations A 50-mL sample of 20% wt/wt suspension of colloidal silica (SNOWTEX™ C) in water was treated with 10 mL of 0.1 N HCl solution to achieve a solution pH of 4. The zeta potential was observed to change slightly from −32 mV to −30 mV upon treatment with HCl. A solid sample of poly[N,N'-bis(2,2,6,6-tetramethyl-4-piperidinyl)-1,6-hexanediamine-co-2,4-dichloro-6-morpholino-1,3,5-triazine] (PPMT, Aldrich Chemical Co. no. 41,324-0, CAS registry no. 82451-48-7) was added directly to the suspension of colloidal silica and stirred. A clear suspension of particles was obtained, which exhibited a zeta potential of +35 mV, indicating the PPMT polymer coating on the silica particle.

Example 15

Adsorption of a Non-Charged Polymer onto Magenta Dye-Coated Silica Nanoparticles, Followed by Protonation, to Achieve a High Zeta Potential Nanoparticle A 0.2 g sample of Rhodamine B dye was added to 20 mL of a 20% w/w suspension of colloidal silica (SNOWTEX™ C), at pH 8.5. This mixture was stirred for about 20 min after which about 5 mL of dilute HCl was added to the suspension until the pH was reduced to about 3. A 0.2 g- sample of poly[N,N'-bis(2,2,6,6-tetramethyl-4-piperidinyl)-1,6-hexanediamine-co-2,4-dichloro-6-morpholino-1,3,5-triazine] (PPMT, Aldrich Chemical Co. no. 41,324-0, CAS registry no. 82451-48-7) was added to this suspension of silica/Rhodamine B nanoparticles at pH 3, with stirring, whereupon the pH increased to about 7.3. Additional dilute HCl was added until the pH was reduced to 4.1. The zeta potential of the particles in this suspension was measured to be +35 mV after HCl addition, indicating protonation of the PPMT polymer.

Example 16

Printing Cotton Fabric with a High Zeta Potential Magenta Nanoparticles

A 3 inch by 1 inch swatch of plain, untreated cotton fabric (with a streaming potential of −23 mV) was dipped into the suspension of magenta nanoparticles prepared in Example 13 for about 10 sec, rinsed in cold water, and then dried under vacuum at ambient temperature. A smaller (about 1 inch by 2 inch) piece of colored fabric was cut from this sample and subjected to the AATCC 61-2A accelerated laundering test, by the ACTS Testing Labs (Buffalo, N.Y.). This test for evaluating colorfastness should show color change similar to that produced by five commercial launderings at 38±3° C. (100±5° F.) or by five home machine launderings at medium or warm setting in this same temperature range. The fabric sample was washed in 150 mL of water at 49° C. (120° F.) with 0.25% SYNTHRAPOL™ detergent, along with 50 (0.6 cm) steel ball bearings. Wash time was 45 min, in a canister being rotated at a rate of 40 rpm. The laundered sample was then washed with water and dried, and the $\Delta E^*$ color change was measured as described above, as compared to an unlaundered sample. The $\Delta E^*$ value was measured to be 5.3 for this sample, on a scale where a color change $\Delta E^*$ value of 5 or less represents a color change that a human eye will not be able to detect as compared with the control sample. This measurement indicates that a zeta potential of +35 mV for the particle suspension is sufficient for this fabric with a streaming potential of −23 mV, to achieve good adhesion and durability.

Example 17

Adsorption of a Non-Charged Polymer onto Cyan Dye-Coated Silica Nanoparticles, Followed by Protonation, to Achieve a High Zeta Potential Nanoparticle A 0.2 g sample of Victoria Blue BO cyan dye (Aldrich Chemical Co., Milwaukee, Wis.) was added to 50 mL of a 20% w/w suspension of colloidal silica (SNOWTEX™ C), at pH 8.5. This mixture was stirred for about 20 min after which dilute HCl was added to the suspension until the pH was reduced to about 4.5. A 0.30 g-sample of poly[N,N'-bis(2,2,6,6-tetramethyl-4-piperidinyl)-1,6-hexanediamine-co-2,4-dichloro-6-morpholino-1,3,5-triazine] (Aldrich Chemical Co. no. 41,324-0, CAS registry no. 82451-48-7; abbreviated PPMT) was added to this suspension of silica/Victoria Blue BO nanoparticles, whereupon the pH increased to about 7.5. About 10 mL of additional dilute HCl was added until the pH was reduced to about 4.5. The zeta potential of this suspension was measured to be +30 mV after HCl addition, indicating protonation of the PPMT polymer.

Example 18

Printing Cotton Fabric with a High Zeta Potential Cyan Nanoparticles

A 3 inch by 1 inch swatch of plain, untreated cotton fabric (with a streaming potential of −23 mV) was soaked with the suspension of cyan nanoparticles prepared in Example 17, rinsed in cold water, and then dried under vacuum at ambient temperature. A smaller (about 1 inch by 0.5 inch) piece of colored fabric was cut from this sample and subjected to the AATCC 61-2A accelerated laundering test. The fabric sample was washed in 150 mL of water at 49° C. (120° F.) with 0.25% SYNTHRAPOL™ detergent, along with 50 (0.6 cm) steel ball bearings. Wash time was 45 min, in a canister being rotated at a rate of 40 rpm. The laundered sample was then washed with water and dried, and the $\Delta E^*$ color change was measured as compared to an unlaundered sample. The $\Delta E^*$ value was measured to be 1.3 for this sample, on a scale where a color change $\Delta E^*$ value of 5 or less represents a color change that a human eye will not be able to detect as compared with the control sample. This measurement indicates that a zeta potential of +30 mV for the particle suspension is sufficient for this fabric with a streaming potential of −23 mV, to achieve strong adhesion and high durability.

Example 19

Coating Melamine Resin Particles with Yellow Colorant And a Charged Polymer

A 10 mL sample of 0.9 micron (μm) particles of poly(melamine formaldehyde) (Microparticles GmbH, Berlin) was prepared as a 2.5% wt/wt sample in water was titrated with 0.1 N HCl solution until the pH was lowered to 4.5. The change in pH of the suspension was monitored by performing the titration while the pH electrode was immersed therein. At pH 4.5, the zeta potential of the suspension was measured at +33 mV. This suspension was stirred while 0.1 g of yellow dye (CIBACRON® Yellow P-6GS) was added, after which the zeta potential was measured at −21 mV (at pH 4.5). After an additional 20 min of stirring, the PE(+) charged polymer, polyethyleneimine permethyl perbromide (Polysciences, Inc., Warrington, Pa., 1800 Mw molecular weight), was added (10 mL of a $10^{-2}$ M solution), after which the zeta potential was measured at +33 mV (at pH 4.5). Zeta potential measurements were taken using a Zetapals Instrument (Brookhaven Instrument Corporation, Holtsville, N.Y.), by adding 1-3 drops of sample into a cuvet containing 1 mM KCl solution, using the instrument's default functions preset for aqueous solutions. This Example indicates how poly(melamine formaldehyde) particles can be coated with a dye followed by a PE(+) charged polymer coating in order to achieve a positive nanoparticle zeta potential which results in strong adhesion to fabric with a negative streaming potential, and thereby providing high durability of print.

Example 20

Coating Melamine Resin Particles with Multiple Colorant and Polyelectrolyte Coatings Melamine resin particles (poly(melamine formaldehyde)) (Microparticles GmbH, Berlin) were suspended in water and titrated with 0.1 N HCl solution until the pH was lowered to 3.7. This suspension was stirred with rhodamine B dye at pH 3.7 to coat the particles, after which the zeta potential of the suspension was measured at +32 mV. This suspension was then stirred while the yellow dye CIBACRON® Yellow P-6GS was added, after which the zeta potential was measured at −24 mV, and the suspension was characterized by an orange color. The PE(+) charged polymer, polyethyleneimine permethyl perbromide (Polysciences, Inc., Warrington, Pa., 1800 Mw molecular weight) was then added, after which the zeta potential was measured at +28 mV. After about 1 hr, the orange particles had settled to the bottom of the flask, indicating that the dyes were adsorbed onto the poly(melamine formaldehyde) particles, and were not in solution.

Example 21

Coating Melamine Resin Particles with Multiple Colorant and Charged Polymer Coatings Melamine resin particles (poly(melamine formaldehyde)) (Microparticles GmbH, Berlin) were suspended in water and titrated with 0.1 N HCl solution until the pH was lowered to 3.7. This suspension was stirred with Rhodamine B dye at this pH to coat the particles, after which the zeta potential of the particles in suspension was measured at +32 mV. This suspension was then stirred while Acid Red 52 dye was added, forming a deep magenta color, after which the zeta potential was measured at −20 mV. Additional Acid Red 52 was added, forming a suspension with a deeper magenta color, and characterized by a zeta potential of −23 mV. To this suspension was added the polytriazine copolymer, poly[N,N'-bis(2,2,6,6-tetramethyl-4-piperidinyl)-1,6-hexanediamine-co-2,4-dichloro-6-morpholino-1,3,5-triazine] (Aldrich Chemical Co. No. 41,324-0, CAS registry no. 82451-48-7; abbreviated PPMT), followed by acidification with 0.1 N HCl, whereupon the zeta potential was found to be +44 mV.

Example 22

Coating Melamine Resin Particles with Multiple Colorant and Charged Polymer Coatings Melamine resin particles (poly(melamine formaldehyde)) (Microparticles GmbH, Berlin) were suspended in water and titrated with 0.1 N HCl solution until the pH was lowered to 3.7. This suspension was stirred with Nile Blue stain at this pH to coat the particles, after which the zeta potential of the suspension was measured at +10 mV, and the suspension was pale blue in color. This suspension was then stirred while CIBACRON® Yellow P-6GS dye was added, forming a green suspension color, after which the zeta potential was measured at −30 mV. To this suspension was added poly[N,N'-bis(2,2,6,6-tetramethyl-4-piperidinyl)-1,6-hexanediamine-co-2,4-dichloro-6-morpholino-1,3,5-triazine] (Aldrich Chemical Co.), followed by acidification with 0.1 N HCl, to bring the pH back to 3.7, whereupon the zeta potential was found to be +44 mV. After about 1 hr, the green particles had settled to the bottom of the flask, showing adsorption of the dyes to the particle surface.

Example 23

Preparation of a Polyelectrolyte Coated Alumina Nanoparticles

A sample of ALUMINASOL™ 100 (Nissan Chemical America Corporation) was diluted from 10% to 1% wt/wt in 1 mM aqueous KCl. The zeta potential of this suspension was measured at +63 mV. This suspension was stirred while 20 ml of a 0.1 M solution of poly(vinyl sulfonic acid, sodium salt) (1800 Mw molecular weight) was added. The suspension was stirred for another 40 min, after which time the zeta potential was measured to be +10 mV, indicating the alumina sol can serve as a template.

Example 24

Preparation of Polyelectrolyte-Dye-Coated Silica Nanoparticles using Alternately Charged Polyelectrolytes, and Zeta Potential Measurements of the Resulting Particles A polyelectrolyte-dye solution was first prepared as follows. A 20 mL sample of $10^{-2}$ M polyethyleneimine permethylated perbromide polyelectrolyte (1800 MW) was stirred while a 0.022-gram sample of acid red 52 (AR52) was added at room temperature. Thus, 0.2 mmol of PE(+) polyethyleneimine permethylated perbromide was treated with 0.04 mmol of dye, meaning that 20% of the sites are occupied with the dye. If this resulting solution is dialyzed with 2000 MW cut off dialysis bags, no dye was observed outside the bag after 16 hr of dialysis, indicating a strong dye-charged polymer complex had formed. This 20 mL sample of polyelectrolyte-dye solution was added to 200 mL of a 0.01% wt/wt suspension of 9-14 nm silica nanoparticles at pH 8.5 and 1M in NaCl. The resulting suspension was stirred for 40 mins at room temperature. This suspension was then stirred overnight against a pH 8.5/1M NaCl solution using 2000 MW cut off dialysis bags. The contents of the dialysis bag were then treated with 20 mL of a $10^{-2}$ M poly(vinyl sulfonic acid, sodium salt) solution (1800 MW) for 40 min at room temperature. The resulting suspension was then dialyzed overnight, as before, with a 2000 MW cut off dialysis bag. Both layering steps could then be repeated if desired to build up layers on the silica nanoparticle. In addition, this process can be performed with up to 1% wt/wt silica nanoparticles and 0.1 M PE(+) polyethyleneimine permethylated perbromide polyelectrolyte. Zeta potentials were measured for the nanoparticle itself, and following subsequent layering of polyelectrolyte(+)-dye, (void) polyelectrolyte(−), and polyelectrolyte(+)-dye, as shown in Table 2. The zeta potential data in Table 2 reflect measurements using magenta, yellow, and cyan dyes in separate experiments, although clearly different dyes can be used on the same nanoparticle to provide specifically tailored colors.

Example 25

Effect of Nanoparticle Zeta Potential on Durability

The AATCC 61-2A test for evaluating colorfastness was used to evaluate and compare the durability of various colored nanoparticles on a single fabric. The AATCC 61-2A test shows color change comparable to five commercial launderings at 38±3° C. (100±5° F.) or by five home machine launderings at medium or warm setting in this temperature range. A cotton sample printed with various colored nanoparticles was washed in 150 mL of water at 49° C. (120° F.) with 0.25% SYNTHRAPOL™ detergent, along with 50 (0.6 cm) steel ball bearings. Wash time was 45 min, in a canister being rotated at a rate of 40 rpm. The laundered sample was then washed with water and dried, and the loss of color, ΔE* was measured according to AATCC 61-2A. Samples that were measured with a ΔE* on a scale where a color change ΔE* value of 5 or less represents a color change that a human eye will not be able to detect as compared with the control sample. The grade ratings were determined through use of the AATCC Gray Scales for Color Change and Staining. Table 4 records the results of the AATCC 61-2A accelerated laundering test for various fabric samples and colorants of the present invention. In Table 4, the following abbreviations are used: SNC is SNOWTEX™ C; PE(+) is polyethylenimine, permethylated, perbromide (MW=1800, Polysciences, Warrington, Pa.); PE(−) is poly (vinylsulfonic acid, sodium salt) MW=2000, Polysciences, Warrington, Pa.); AR52 is acid red 52 dye; RhB is rhodamine B dye; MR is melamine formaldehyde particles, comprising poly(melamine formaldehyde) resin. The nanoparticle core and the order of layering is indicated by the sequence as presented in the table. The dramatic differences shown in this table indicate the importance of zeta potential of the nanoparticle in providing enhanced durability.

TABLE 4

Effect of Nanoparticle Zeta Potential on Durability Measured by AATCC-61-2A

| Nanoparticle | Zeta Potential (mV) | ΔE*, Loss of Color on Laundering (Cotton) |
|---|---|---|
| SNC/PE(+)-AR52 | −28 | 49.0 |
| SNC/PE(+)-AR52/PE(−)/PE(+)-AR52 | −24 | 43.8 |
| SNC/PE(+)-PE(−)-RhB/PE(+) | −20 | 37.4 |
| SNC/PhB | −10 | 12.0 |
| MR/PhB | +42 | 5.7 |
| MR/RhB | +78 | 1.3 |

Example 26

Colorfastness Testing of Fabrics Printed with Nanoparticle Ink

A variety of fabrics were printed using nanoparticle inks of the present invention, and colorfastness and printability tests were conducted on the resulting printed fabrics. Table 5 records the data obtained in these tests. The particular colorfastness tests used are indicated, where AATCC is the American Association of Textile Chemists and Colorists, and ACTS is the ACTS Testing Laboratory, Buffalo, N.Y. These tests were performed at the ACTS Testing Laboratory on fabrics printed with a suspension of magenta melamine resin nanoparticles. The colorfastness gray scale method used to judge these tests ranges from 1 to 5, with 3 and higher deemed passing (no detectable change).

TABLE 5

Colorfastness Testing of Fabrics Printed with Nanoparticle Ink

| Test and Method | Cotton | Nylon | Silk |
|---|---|---|---|
| Printability | Pass | Pass | Pass |
| Colorfastness to Water (AATCC 107) | 4 | 3.5 | 4 |
| Colorfastness to Perspiration (AATCC 15) | 5 | 4 | 5 |
| Colorfastness to Accelerated Laundering (AATCC 61-2A) | 3.5 | 3.5 | 3.5 |
| Colorfastness to Chlorine Bleach (ACTS Method TX-006) | 3.5 | 3.5 | 3.5 |
| Colorfastness to Non-Chlorine Bleach (ACTS MEthod TX-011) | 4.5 | 4.5 | 3.5 |
| Colorfastness to Crocking (AATCC 8) | 4 | 3 | 3.5 |

Example 27

Comparison of Colorfastness Testing of Fabrics Printed with Standard Inks versus Nanoparticle Inks In this test, both coated cotton and uncoated cotton were utilized as substrates to compare colorfastness of the nanoparticle ink of the present invention with standard inks that do not employ nanoparticle technology. The coated cotton was post treated with steam, followed by rinsing, and this "improved" substrate was treated with a standard magenta ink. The standard colorant treatment was a Kimberly-Clark medium red (magenta) ink, prepared using the following formulation in Table 6.

TABLE 6

Formulation for Standard Magenta Ink for Comparison Testing

| Ink Component | Weight % | Supplier |
|---|---|---|
| DI water | 82.0 | — |
| Versene ® 100XL | 0.6 | Dow Chemical Co., Midland Michigan |
| EDTA•2Na | 0.3 | Dow Chemical Co., Midland Michigan |
| N-methylmorpholine-N-oxide | 3.0 | Aldrich Chemical Co., Milwaukee, Wisconsin |
| Glycerine | 3.5 | Aldrich Chemcial Co., Milwaukee, Wisconsin |
| PEG-400 | 5.0 | Aldrich Chemcial Co., Milwaukee, Wisconsin |
| Proxel ® GXL | 0.3 | Zenneca Corp., Wilmington, Delaware |
| Cobratec ® Soln | 0.3 | PMC Speciality Group, Cincinnati, Ohio |
| Surfynol ® 504 | 0.1 | Air Products, Allentown, Pennsylvania |
| Surfynol ® 465 | 0.2 | Air Products, Allentown, Pennsylvania |
| Reactive Dye RM 7034, Cibacron ® Red P-6B | 4.7 | Ciba Specialty Chemicals Corp., Highpoint, North Carolina |
| Total | 100.0 | |

The nanoparticle colorant was a suspension of magenta melamine resin nanoparticles, and was applied to an uncoated cotton fabric that employed no post treatment. Table 7 records the results of these tests, which reveal that even unimproved substrates with nanoparticle inks perform better than improved substrates with standard inks. The colorfastness gray scale method used to judge these tests ranges from 1 to 5, with 3 and higher deemed passing (no detectable change).

TABLE 7

Comparison of Colorfastness Testing of Fabrics Printed with Standard Ink versus Nanoparticle Ink

| Test and Method | Standard Ink | Nanoparticle Ink |
|---|---|---|
| Substrate | coated cotton | uncoated cotton |
| Post treatment | steam + rinse | None |
| Printability | Pass | Pass |
| Colorfastness to Water (AATCC 107) | 4.5 | 4.5 |
| Colorfastness to Perspiration (AATCC 15) | 4.5 | 4.5 |
| Colorfastness to Accelerated Laundering (AATCC 61-2A) | 1.5 | 3 |
| Colorfastness to Chlorine Bleach (ACTS Method TX-006) | 4.5 | 4.5 |
| Colorfastness to Nom-Chlorine Bleach (ACTS Method TX-011) | 3 | 4.5 |
| Colorfastness to Crocking (AATCC 8) | N/A | 4 |

Example 28

Effect of Fabric on the Durability of Nanoparticle Inks

The durability of the inks of the present invention when applied to various fabrics was tested, in order to ascertain the effect of the choice of fabric. As shown in Table 8 below, all the fabrics tested were measured as having negative streaming potentials, while the melamine resin nanoparticles were measured with a positive zeta potential. Both a magenta melamine nanoparticle, and a cyan melamine resin nanoparticle of the present invention were employed in this study. Durability is measured as both colorfastness to accelerated laundering (AATCC 61-2A test) and as colorfastness to crocking (AATCC 8). The colorfastness gray scale method used to judge these tests ranges from 1 to 5, with 3 and higher deemed passing (no detectable change).

TABLE 8

Effect of Fabric on the Durability of Nanoparticle Inks

| Fabric | Streaming Potential (mV) | Durability | | | |
|---|---|---|---|---|---|
| | | Accelerated Laundering (AATCC 61-2A) | | Colorfastness to Crocking (AATCC 8) | |
| | | Magenta | Cyan | Magenta | Cyan |
| Cotton | −21 | 3.5 | 3 | 4 | 4.5 |
| Nylon | −32 | 3.5 | 3.5 | 3 | 3 |
| Silk | −26 | 3.5 | 3.5 | 3.5 | 4 |
| Polyester | −20 | — | 3.5 | — | 3.5 |

Example 29

Preparation of Colored Nanoparticles Using Different Dyes to Obtain Unusual Colors One feature of the present invention is the ability to prepare nanoparticle colorants with unusual or hard-to-obtain colors. Thus, when adsorbing each layer onto the nanoparticle template, each charged polymer layer can employ a different dye for fine tuning colors. Thus, silica nanoparticles were coated with a PE(+)/Acid Red 52 layer to yield magenta nanoarticles, which were subsequently coated with a PE(+)/cyan layer to afford lilac colored nanoparticles. The cyan colorant used was copper phthalocyanine, tetrasulfonic acid, sodium salt. Thus, by mixing layers of color in this fashion, a uniform ink/dye system of unusual color can be prepared. This result is to be contrasted to simple mixtures of colorants or dyes that would not result in a similarly true color, but rather the hues of the component dyes.

Example 30

Preparation and Utility of a Surface Modifying Ink Jet Ink Containing Nanoparticles Silica nanoparticles (SNOWTEX™ C, Nissan Chemical) were treated with polyvinylpyrrolidone (Mw 10,000) in an aqueous suspension at pH 8.5 and 1 M in NaCl, for a period of 2 hours. The zeta potential of the nanoparticles changed from −34 mV to −10 mV and the nanoparticle size changed from 10 nm to 25 nm as a direct result of the adsorption of the polyvinylpyrrolidone onto the silica nanoparticle. Excess polyvinylpyrrolidone was removed by dialysis against a 1 M NaCl solution at pH 8.5 for 16 hours, with a 20,000 MW cut off. The resulting suspension of modified nanoparticles was drawn down onto a sheet of Neenah bond paper. When this paper was allowed to dry, it was observed to have a high gloss. This example demonstrates that nanoparticle technology may be used in an inkjet system for surface modification of a substrate. This example differs from others in this disclosure in that the ink used for surface modification is not colored.

Further discussion of nanoparticles may be found in U.S. patent application Ser. No. 09/969,163, entitled, "Recording Medium with Nanoparticles and Methods of Making the Same", by R. S. Nohr, J. G. MacDonald and B. Kronberg, filed contemporaneously herewith.

It should be understood, of course, that the foregoing relates only to certain embodiments of the present invention and that numerous modifications or alterations may be made therein without departing from the spirit and the scope of the invention.

What is claimed is:

1. An ink composition for a printing process comprising:
a nanoparticle having a size less than about 1,000 nanometers comprising a particle template having more than one colorant layer disposed upon the particle template;
a liquid vehicle; and
a protective layer disposed upon the colorant layer;
wherein the protective layer is a charged polymer.

2. An ink composition for a printing process comprising:
a nanoparticle having a size less than about 1,000 nanometers comprising a particle template having more than one colorant layer disposed upon the particle template; and
a liquid vehicle;
wherein the nanoparticle has a zeta potential of about +20 mV or greater.

3. An ink composition for a printing process comprising:
a nanoparticle having a size less than about 1,000 nanometers comprising a particle template having more than one colorant layer disposed upon the particle template; and
a liquid vehicle;
wherein the nanoparticle has a zeta potential of about +50 mV or greater.

4. An ink composition for a printing process comprising:
a particle comprising a particle template having a zeta potential, at least one charged polymer layer having a zeta potential, and a protective layer having a zeta potential different from the at least one charged polymer layer adjacent thereto; and
a liquid vehicle.

5. The ink composition of claim 4, wherein the particle further comprises at least one colorant layer.

6. The ink composition of claim 4, wherein the at least one charged polymer layers comprises a plurality of charged polymer layers,
wherein the zeta potential of the plurality of charged polymer layers are different from the at least one charged polymer layer adjacent thereto.

7. The ink composition of claim 6, wherein the plurality of charged polymer layers has at least one colorant-charged polymer layer comprising a colorant.

8. The ink composition of claim 7, wherein the at least one colorant-charged polymer layer comprises a plurality of charged polymer-colorant layers,
wherein the colorant of the adjacent charged polymer-colorant layers are the same or different from one another, and
wherein the zeta potential of adjacent charged polymer-colorant layers are different.

9. An ink composition for a printing process comprising:
a particle comprising a particle template, at least one colorant-charged polymer layer comprising at least one colorant, a protective layer, and at least one void charged polymer layer,
wherein the particle template, the at least one colorant-charged polymer layer, the protective layer and the at least one void charged polymer layer have a zeta potential; and
a liquid vehicle.

10. The ink composition of claim 9, further comprising a plurality of alternating layers of void charged polymer layers and charged polymer-colorant layers,
wherein the at least one void charged polymer layer is disposed between the at least one charged polymer-colorant layer; and
wherein the alternating void charged polymer layers and the charged polymer-colorant layers have zeta potentials different from the void charged polymer layer or charged polymer-colorant layer adjacent thereto.

11. The ink composition of claim 10, wherein the plurality of alternating layers of charged polymer-colorant layers and void charged polymer layers substantially cover the layer adjacent thereto.

12. An ink composition for a printing process, comprising:
a particle comprising a particle template and at least one colorant-charged polymer layer comprising at least one colorant, wherein the particle template and the at least one colorant-charged polymer layer have a zeta potential; and further comprising a plurality of alternating layers of charged polymer-colorant layers, wherein the alternating charged polymer-colorant layers have zeta potentials different from the charged polymer-colorant layer adjacent thereto, and wherein the at least one colorant in the alternating charged polymer-colorant layers is the same or different from the at least one colorant in the charged polymer-colorant layer adjacent thereto; and
liquid vehicle.

13. The ink composition of claim 12, wherein the plurality of alternating layers of charged polymer-colorant layers substantially cover the layer adjacent thereto.

14. The ink composition of claim 12, further comprising a protective layer, wherein the protective layer has a zeta potential.

15. A method of making a recording medium for a printing process comprising:
providing a particle having a zeta potential comprising a particle template;
coating the particle template with at least one charged polymer having a zeta potential and a protective layer having a zeta potential different from the at least one charged polymer layer adjacent thereto; and
suspending the particle in a liquid vehicle.

16. The method of making a recording medium of claim 15, wherein the nanoparticle has a zeta potential of about +20 mV or greater.

17. The method of making a recording medium of claim 15, wherein the nanoparticle has a zeta potential of about +50 mV or greater.

18. A method of making a recording medium for a printing process comprising:
providing a particle comprising a particle template;
coating the particle template with at least one colorant-charged polymer layer comprising at least one colorant, a protective layer, and at least one void charged polymer layer, wherein the colorant-charged polymer layer, the protective layer, and the at least one void charged polymer layer have a zeta potential; and
suspending the particle in a liquid vehicle.

19. A method of making a recording medium for a printing process comprising:
providing a particle comprising a particle template having a positive or negative zeta potential;
coating the template with a first charged polymer having a zeta potential different from that of the template to form a first charged polymer layer; and
coating the first charged polymer layer with at least one subsequent charged polymer to form at least one subsequent charged polymer layer on the template, wherein the zeta potential of the successive charged polymer layers are different from those of the charged polymer layers adjacent thereto; and
suspending the particle in a liquid vehicle.

* * * * *